United States Patent
Watanabe

(10) Patent No.: US 6,963,332 B1
(45) Date of Patent: Nov. 8, 2005

(54) LETTER INPUT METHOD AND DEVICE USING THE SAME

(75) Inventor: Mitsuhiro Watanabe, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/435,996

(22) Filed: Nov. 8, 1999

(30) Foreign Application Priority Data

Nov. 10, 1998 (JP) .................................. 10-319372

(51) Int. Cl.⁷ .............................................. G09G 5/08
(52) U.S. Cl. ...................................... 345/161; 715/531
(58) Field of Search ................................ 345/161, 163, 345/184, 171; 700/85; 463/38; 341/28; 715/531

(56) References Cited

U.S. PATENT DOCUMENTS

| | | | | |
|---|---|---|---|---|
| 4,872,196 A | * | 10/1989 | Royer et al. ................. | 455/564 |
| 4,910,503 A | * | 3/1990 | Brodsky ...................... | 345/161 |
| 5,457,454 A | * | 10/1995 | Sugano ........................ | 345/179 |
| 5,563,631 A | * | 10/1996 | Masunaga .................... | 345/169 |
| 6,011,542 A | * | 1/2000 | Durrani et al. ............. | 345/156 |
| 6,225,980 B1 | * | 5/2001 | Weiss et al. ................ | 345/161 |
| 6,351,657 B2 | * | 2/2002 | Yamada ....................... | 455/566 |
| 6,496,181 B1 | * | 12/2002 | Bomer et al. ................ | 345/167 |
| 6,567,072 B2 | * | 5/2003 | Watanabe .................... | 345/161 |

FOREIGN PATENT DOCUMENTS

| | | |
|---|---|---|
| JP | 63-58590 | 3/1988 |
| JP | 64-17113 | 1/1989 |
| JP | 2-101633 | 8/1990 |
| JP | 5-341903 | 12/1993 |
| JP | 6-131095 | 5/1994 |
| JP | 6-161433 | 6/1994 |
| JP | 6-202807 | 7/1994 |
| JP | 7-129294 | 5/1995 |
| JP | 7-168658 | 7/1995 |
| JP | 10-187343 | 7/1998 |

OTHER PUBLICATIONS

Japanese Office Action, dated Sep. 19, 2001, with English language translation of Japanese Examiner's comments.
Japanese Office Action dated May 19, 2004 with English transaltion of pertinent portions.

* cited by examiner

*Primary Examiner*—Heather R. Herndon
*Assistant Examiner*—Doug Hutton
(74) *Attorney, Agent, or Firm*—Whitham, Curtis & Christofferson, PC

(57) ABSTRACT

A method for inputting Japanese letters and a device with which the method is carried out are provided. The method involves prearranging predetermined letters and symbols in a matrix array of M columns and N rows, and inputting a desired letter or symbol by designating the corresponding column and row coordinate. In one embodiment, the designation of the corresponding coordinate is accomplished by use of the pointer of a direction designation unit, the unit having positions corresponding to the coordinates uniformly spaced in a circular pattern.

42 Claims, 26 Drawing Sheets

FIG.1
(a)
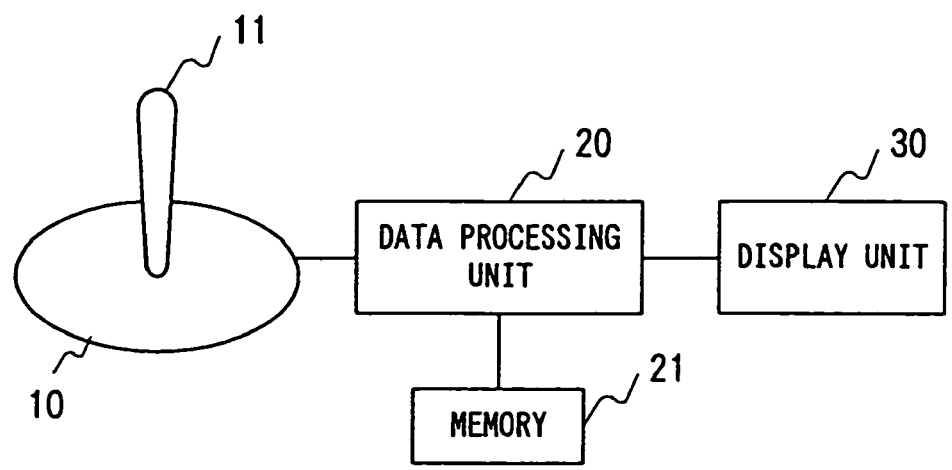
(b)
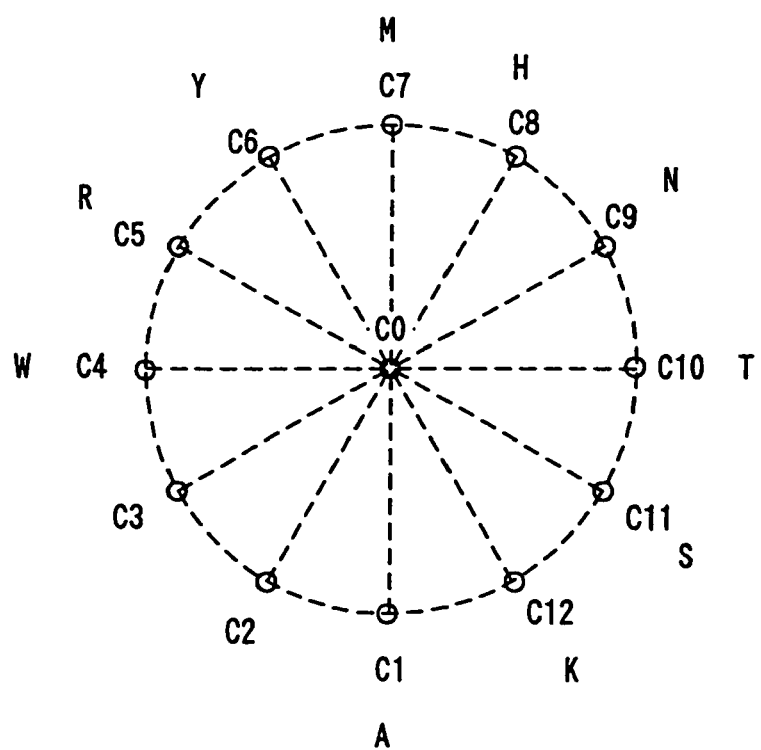

| STATE | OUTPUT(BINARY) |
|---|---|
| C0 | 000000000000 |
| C1 | 000000000001 |
| C2 | 000000000010 |
| C3 | 000000000100 |
| C4 | 000000001000 |
| C5 | 000000010000 |
| C6 | 000000100000 |
| C7 | 000001000000 |
| C8 | 000010000000 |
| C9 | 000100000000 |
| C10 | 001000000000 |
| C11 | 010000000000 |
| C12 | 100000000000 |

(b)

| STATE | OUTPUT (HEXADECIMAL) |
|---|---|
| C0 | 0h |
| C1 | 1h |
| C2 | 2h |
| C3 | 3h |
| C4 | 4h |
| C5 | 5h |
| C6 | 6h |
| C7 | 7h |
| C8 | 8h |
| C9 | 9h |
| C10 | Ah |
| C11 | Bh |
| C12 | Ch |

FIG.3
(a)
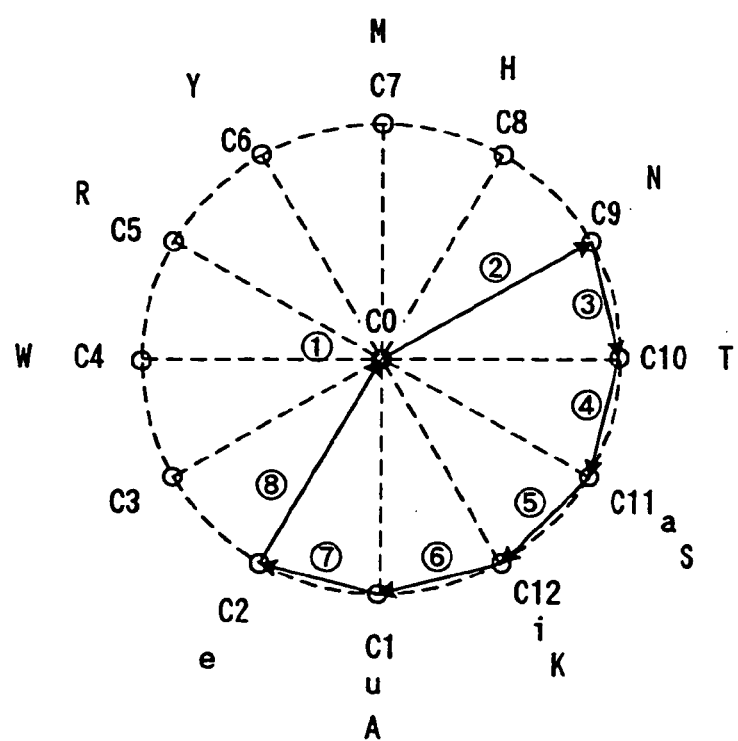
(b)
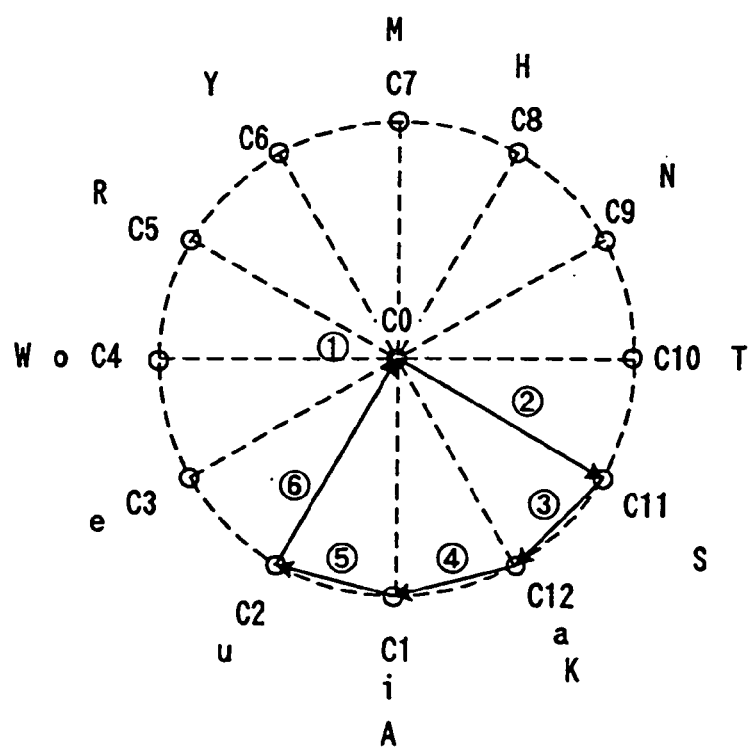

(a)

| | | | |
|---|---|---|---|
| ① | ⎾ ─ ⏋ | 1401 | |
| ② | ⎾ S ⏋ | 1402 | |
| ③ | ⎾ K ⏋ | 1403 | |
| ④ | ⎾ A ⏋ | 1404 | |
| ⑤ | ⎾ K ⏋ | 1405 | |
| ⑤' | ⎾ Ka ⏋ | 1406 | |
| ⑥ | ⎾ Ki ⏋ | 1407 | |
| ⑦ | ⎾ Ku ⏋ | 1408 | |
| ⑦' | ⎾ Ku ⏋ | 1409 | |
| ⑧ | ⎾ Ku ⏋ | 1410 | |

| JAPANESE CHARACTER | | ROMAN ALPHABET | |
|---|---|---|---|
| あ | = | a | 1421 |
| い | = | i | 1422 |
| う | = | u | 1423 |
| え | = | e | 1424 |
| お | = | o | 1425 |
| か | = | Ka | 1426 |
| さ | = | Sa | 1427 |
| た | = | Ta | 1428 |
| な | = | Na | 1429 |

(b)

FIG.17
(a)
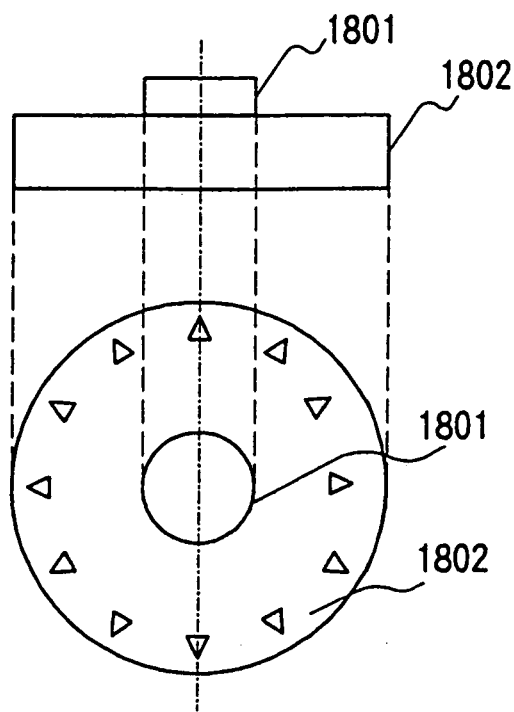
(b)
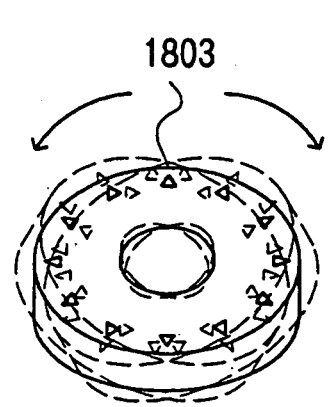
FIG.18
(a)
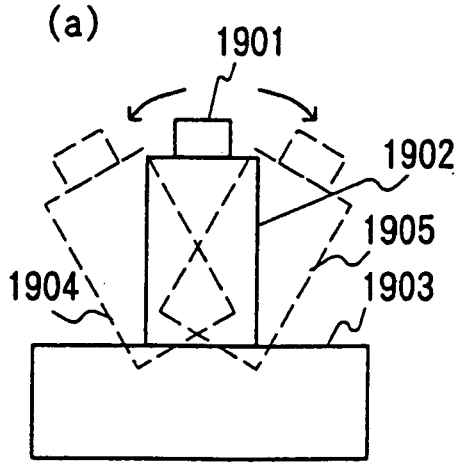
(b)
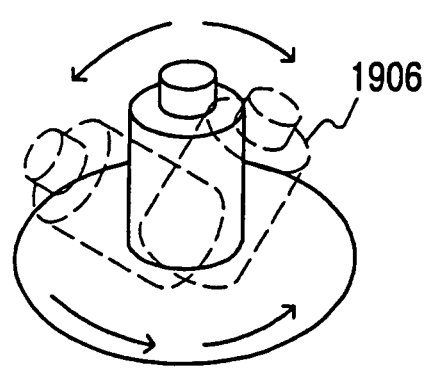

FIG.19
(a)
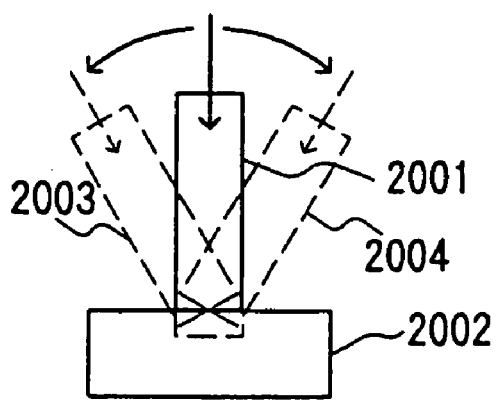
(b)
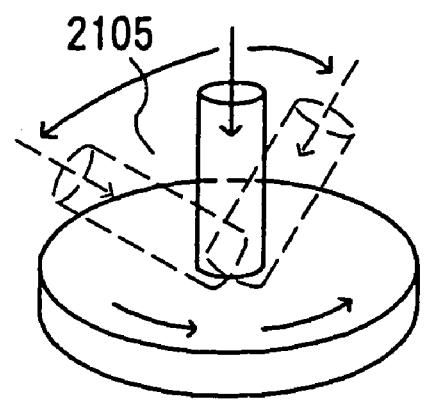
(c)
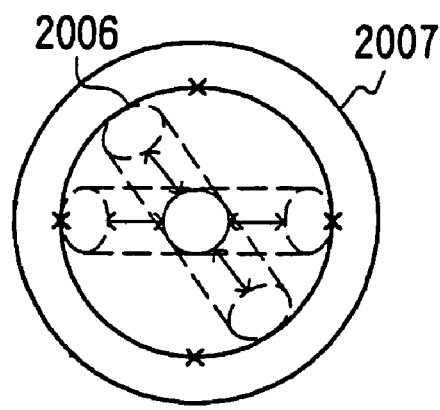
(d)
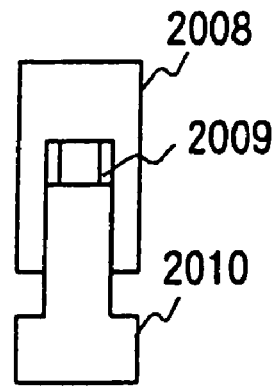

FIG.22
(a)
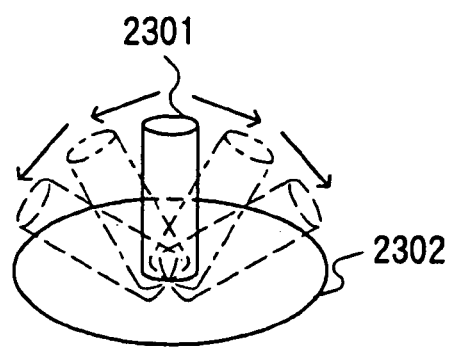
(b)
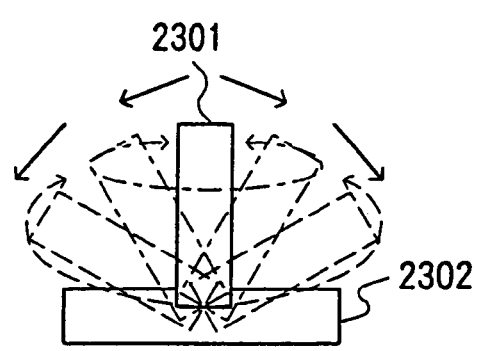
(c)
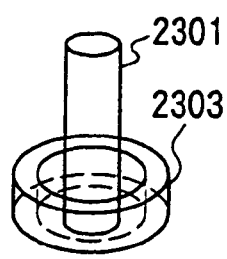
(d)
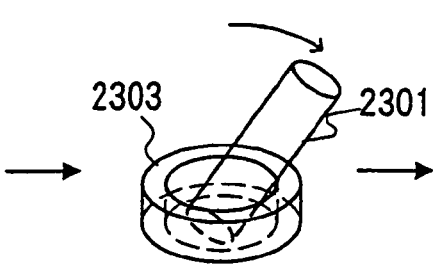
(e)
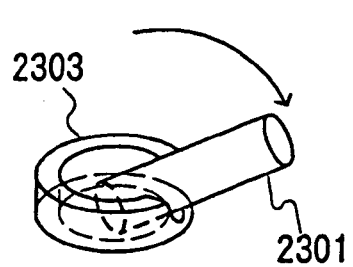

| STATE | OUTPUT(BINARY) |
|---|---|
| C0-1 | 000000000000 |
| C1-1 | 000000000001 |
| C2-1 | 000000000010 |
| C3-1 | 000000000100 |
| C4-1 | 000000001000 |
| C5-1 | 000000010000 |
| C6-1 | 000000100000 |
| C7-1 | 000001000000 |
| C8-1 | 000010000000 |
| C9-1 | 000100000000 |
| C10-1 | 001000000000 |
| C11-1 | 010000000000 |
| C12-1 | 0100000000000 |
| WITHOUT USE | 1000000000000 |
| C1-2 | 1000000000001 |
| C2-2 | 1000000000010 |
| C3-2 | 1000000000100 |
| C4-2 | 1000000001000 |
| C5-2 | 1000000010000 |
| C6-2 | 1000000100000 |
| C7-2 | 1000001000000 |
| C8-2 | 1000010000000 |
| C9-2 | 1000100000000 |
| C10-2 | 1001000000000 |
| C11-2 | 1010000000000 |
| C12-2 | 1100000000000 |

(b)

| STATE | OUTPUT (HEXADECIMAL) |
|---|---|
| C0-1 | 00h |
| C1-1 | 01h |
| C2-1 | 02h |
| C3-1 | 03h |
| C4-1 | 04h |
| C5-1 | 05h |
| C6-1 | 06h |
| C7-1 | 07h |
| C8-1 | 08h |
| C9-1 | 09h |
| C10-1 | 0Ah |
| C11-1 | 0Bh |
| C12-1 | 0Ch |
| C12-1 | 0Dh |
| WITHOUT USE | 0Eh |
| WITHOUT USE | 0Fh |
| WITHOUT USE | 10h |
| C1-2 | 11h |
| C2-2 | 12h |
| C3-2 | 13h |
| C4-2 | 14h |
| C5-2 | 15h |
| C6-2 | 16h |
| C7-2 | 17h |
| C8-2 | 18h |
| C9-2 | 19h |
| C10-2 | 1Ah |
| C11-2 | 1Bh |
| C12-2 | 1Ch |
| WITHOUT USE | 1Dh |
| WITHOUT USE | 1Eh |
| WITHOUT USE | 1Fh |

FIG.25
(a)
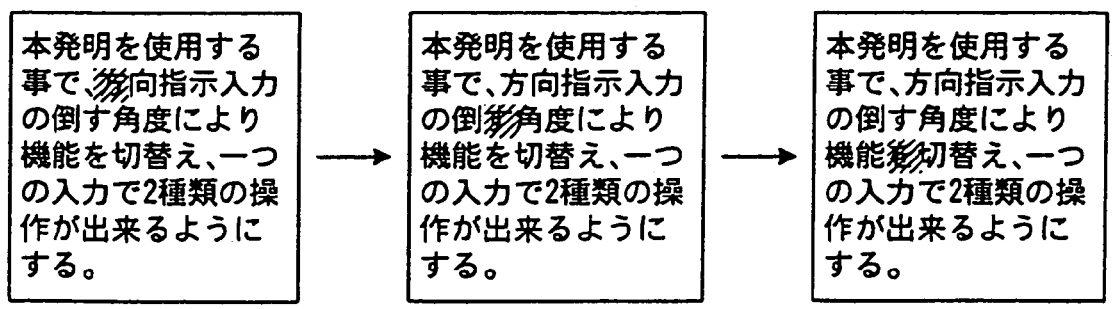
(b)
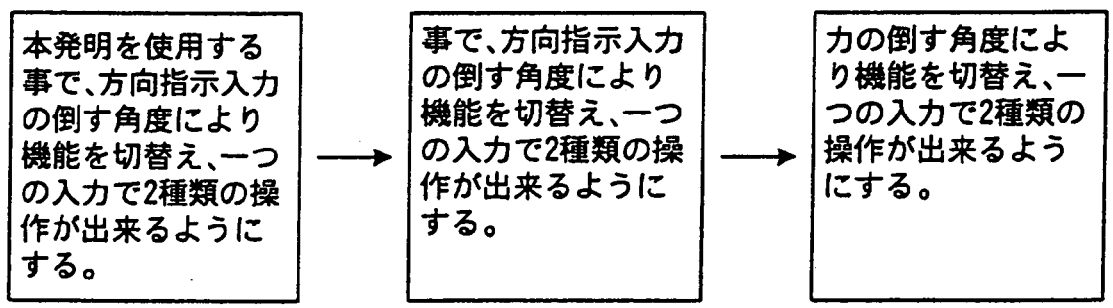

LETTER INPUT METHOD AND DEVICE USING THE SAME

BACKGROUND OF THE INVENTION

The present invention relates to letter input methods and devices and, more particularly, to small-size Japanese letter input devices for portable terminals.

Among usual letter input means are keyboards with key top impression of alphabets, numerals, Japanese kana letters, etc. and also ten key sets used for portable telephone sets or the like.

Among other typical letter input devices are touch panels. A touch panel is a letter input device for inputting position data corresponding to its touched spot. This device has an integral display with a keyboard display thereon. By touching the keyboard display at spot thereof, corresponding letter data is inputted.

Japanese Patent Laid-Open No. 63-58590 entitled "Vector Pattern Input Device" discloses a character input device using a touch panel. In this device, characters are inputted by recognizing them from strokes drawn on the touch panel.

Japanese Patent Laid-Open No. 6-161433 entitled "Electronic Musical Instrument with Letter Input Function" discloses a device using a rotary dial, which is rotatable for displaying letters on a display. In this device, Letters are inputted when they are displayed. This device has a set selection switch for selecting a numeral set and a large and a small alphabet letter set. The large and small letter sets are selected by depressing the switch.

Japanese Patent Laid-Open No. 7-129294 entitled "Letter Input Device" discloses a letter input device, which permits inputting letters with a single hand. To this end, the device comprises a frame, which is of such a size that it can be gripped with a single hand and has a rotor capable of being rotated with the thumb and a key switch operable with a finger other than the thumb. In this device, letters are inputted by deducing a vowel row from a detected angle of rotation of a rotary bar and deducing a consonant column from a detected state of depression of a key switch.

Japanese Patent Laid-Open No. 7-168658 entitled "Letter Input Device and Method" discloses input of letters by using a track pole and a set of step-wise depression adjustment switches. In this case, four switches capable of detecting five depression steps are used to determine letters to be inputted, and a track pole is used to cause movement of a cursor displayed on a display. In this way, the input of letters and the cursor operation are permitted.

Japanese Patent Laid-open No. 6-202807 entitled "Letter Input/Display Device" discloses an input device using a mouse. In the device, a table of letters is partly displayed on a display for scrolling by moving a mouse. When a desired letter appears, it can be inputted by clicking the mouse.

Japanese Patent Laid-Open No. 6-131095 entitled "Japanese Kana Letter Input System Based on Pointing Device" discloses combined use of a pointing device and a push button switch having a single button capable of being depressed in a plurality of different steps. In this case, certain steps of depression of the button are allotted to the consonant mark and p-sound mark of Japanese kana letters. The input of Japanese kana letters is thus simplified by the combination of the 50-letter set displayed on a display and the button.

Japanese Patent Laid-Open No. 5-341903 entitled "Letter Information Input Device" discloses simplified letter input. In this case, a tablet is used, and a keyboard display is made on a display. In this letter information input device, a letter is not inputted absolutely by pointing a position on the display. Instead, the letter is inputted according to position relative to the pointed position, that is, touch feel letter input is possible without reference to the display.

The above first-mentioned case of letter input by using a usual keyboard, has the following problems. Where romaji letters are inputted with a keyboard, at least 26 letter keys are necessary in addition to a large/small letter size switch key and numeral keys, that is, a total of at least 40 keys are necessary.

In addition, where these keys are to be depressed with fingers, the size of each of key in the set can not be made smaller than is necessary for being depressed with a finger. Thus, a large area is required as a whole.

This input method poses no problem in the case of a relatively large device used on a desk, such as a desk top personal computer or a note personal computer. However, in relatively small portable terminals such as PDAs (personal digital assistants), it is not so realistic to mount a keyboard. Besides, in the case of a PDA or like terminal which is relatively frequently held and used with a single hand rather than being put on a desk, it is extremely difficult to input letters with a keyboard.

The above second case, in which a touch panel is used for letter recognition, has the following problems. In a small-size device such as a portable telephone set or like portable terminal, if it is intended to secure a hand-written letter input area for letter recognition, the display area of the screen is reduced, thus making it difficult to input a sentence. In addition, for inputting letters it is necessary to use in combination a pen or like relatively thin input device with a pointed tip. This means that a pen or the like should always be carried and be taken out whenever letter data is to be inputted. Moreover, in such a situation it is necessary to use the pen while holding the device body with one hand. That is, it is necessary to hold the pen with one hand while holding the body with the other hand. Both hands are thus occupied.

The above third-mentioned case, which is an electronic musical instrument with a letter input function and having a dial for selecting letters and also a set selection switch for selecting a small or a large letter set, has the following problem. For detecting a letter on the diametrically opposite dial side of a presently selected letter, i.e., 180-degree out-of-phase therefrom, a number of finger operations are necessary. It is thus difficult to continuously input a large number of letters.

The above fourth-mentioned letter input device has the following problems. In this case, a rotor is used to deduce vowel rows, and a key switch is used to deduce consonant columns. However, it is difficult to determine by the sense of feel the rotation angle of the rotor corresponding to a vowel row to be selected. Also, it is difficult to determine by feel the number of times of depression of the key switch corresponding to a desired consonant column to be selected. For letter selection, it is thus necessary such means that all the letters capable of being selected are always displayed on a display for selecting letters with reference to the display. Such a display of letters, however, requires a corresponding display area. This means that it is difficult to input letters by viewing a sentence. Besides, since letters are inputted with two different kinds of switches, i.e., the rotor and a see-saw switch, it is impossible to input letters with a single finger.

The above fifth-mentioned case of letter input, i.e., the letter input device and method using a plurality of step-wise depression adjustment switches for the letter input, has the following problems. In this case, positions of one of the switches which can be depressed step-wise is allotted to the vowels, and positions of the other switches are allotted to the consonants. This dictates the user to memorize the vowels and consonants corresponding to the respective switch positions. However, it is rather difficult for the user to memorize these switch positions. In addition, the switches are adapted to produce clicks when they are depressed step-wise to the individual positions, and thus can be readily depressed to desired positions. However, since a plurality of switches are provided, their depression forces adjustment at a time is difficult.

The above sixth-mentioned case, i.e., the letter input/display device, in which the 50-letter set is displayed on a display for scrolling, and a desired letter is inputted with a determining button switch when it appears, has the following problem. In this case of letter input the display should be scrolled at a high speed such as on a display unit of a personal compute CRT monitor. However, in the case of a liquid crystal display in a portable terminal or the like, such scrolling makes it difficult to recognize the display and frequently makes it substantially impossible to select letters.

The above seventh-mentioned case, i.e., the Japanese kana letter input system based on pointing device, has a problem that a Japanese kana letter set should be displayed on a display. In a portable terminal or the like, the display area of the screen is too small to be able to display the kana letter set, or if such display is possible, the size of the individual displayed letters is extremely small. This means that it is difficult to select letters.

The above eighth-mentioned case, i.e., the letter information input device, is applicable to devices without need of portability considerations. A problem in this case resides in the use of a tablet independently of the display screen for the letter input. The tablet requires an extra space, and is therefore unsuited to the cases concerning the portability.

SUMMARY OF THE INVENTION

An object of the present invention is to provide a letter input device for a portable terminal and a method thereof, which can solve the above problems and permits letters, particularly Japanese kana letters to be easily inputted with less necessary space.

Another object of the present invention is to permit letter input even in a situation that both hands can not be used at a time, i.e., permit letter input with a single hand, without use of any such pointing device as a touch panel or a mouth.

A further object of the present invention is to permit letter selection with finger movement instead of selecting letters with reference to a letter table displayed on a display.

According to an embodiment of the present invention, there is provided a Japanese letter input method of inputting letters in a letter set used in a Japanese letter input device, the method comprising the steps of: prearranging predetermined letters and symbols in a matrix array of M columns and N rows; and inputting any desired letter or symbol by designating corresponding column and row coordinates in a predetermined order with a position input means.

The letter set is obtained by arranging kana letters in the 50-letter set in a matrix array of columns and rows, the columns each consisting of letters assigned by the same consonant, the rows each consisting of letters of the same vowel, the symbols including the consonant mark and the p-sound mark.

The letter set is formed by arranging romaji alphabet letters, numerals and symbols in columns and rows.

According to an embodiment of the present invention, there is provided a Japanese letter input device for a portable terminal comprising: a direction designation unit having a plurality of (i.e., m) direction designation positions uniformly spaced apart in a circle with the consonant at a reference position and having a predetermined radius, the direction designation unit including a pointer capable of being moved from the reference position radially in a two-dimensional plane and then circumferentially and then returned to the reference position, the direction designation unit being capable of detecting a first direction designation position, which the pointer is first radially moved to, and a second direction designation position, which the pointer is located at before being moved circumferentially and then returned to the reference position, and outputting position data of the detected direction designation position; a data processing unit for generating letter codes from the position data outputted from the direction designation unit by using a memory means with a letter set stored therein; and a display unit displaying the letter modes generated at the data processing unit.

The Japanese letter input device further comprises a buffer for temporarily storing input data of the direction designation unit.

In the Japanese letter input device, a plurality of letter sets are stored, and which further comprises a means for selecting each of the letter sets.

In the Japanese letter input device, one of the letter sets is in the form of an M-column N-row matrix array obtained by arranging kana letters in the 50-letter set in a matrix array of columns and rows, the columns each consisting of letters assigned by the same consonant, the rows consisting of letters of the same level, and symbols including the consonant mark and the p-sound mark, direction designation positions being each allotted to each row of the letter set.

In the Japanese letter input device, one of the letter sets is obtained by arranging romaji alphabet letters, numerals and symbols in M columns and N rows.

In the Japanese letter input device, the data processing unit selects a row of the letter set corresponding to the first direction designating position represented by the position data outputted from the direction designation unit.

In the Japanese letter input device, the data processing unit detects, upon reception of the position data representing the second direction designation position from the direction designation unit, an interval of circumferential movement of the pointer from the difference between this position data and the previously received position data representing the first direction designation position, selects a row of the letter set, and outputs, upon reception of a determination signal, a code of a particular letter or symbol in the letter set by combining the selected column and row of the letter set.

In the Japanese letter input device, the direction designation unit continuously outputs position data during movement of the pointer, and the data processing unit causes, upon reception of the position data of the first direction designation position, a code representing a row of the letter set corresponding to the first direction designation position, for instance the first column letter in the same row, to be displayed on the display unit, causes, after determination of the displayed row of the letter set, letters representing columns determined by intervals of movement of the pointer to be successively displayed on the display unit, and outputs, upon determination of a displayed letter, a signal representing the same displayed letter.

In the Japanese letter input device, the data processing unit causes, while the pointer is circumferentially moved in a predetermined direction after starting movement from the reference position and reaching the first direction designation position, causes such row selection mode indication as to cause letters representing rows of the letter set corresponding to relayed direction designating positions to be successively displayed on the display unit, determines, when the pointer is once stopped and then turns to be moved in the reverse direction, a row of the letter set corresponding to the direction designation position, which the pointer is once stopped at, while also deciding that a row selection mode has been set up and causing successive display of letters representing rows corresponding to intervals of movement of the pointer, decides, when the pointer is returned to the reference position, that the prevailing displayed row has been determined, thus outputting a signal of a letter corresponding to the determined column and row.

In the Japanese letter input device, the direction designation unit includes a determining switch for informing, when the first and second direction designation positions and the combination thereof are determined while the pointer is moved, the determination to the data processing unit.

In the Japanese letter input device, the direction designation unit includes a pointer mechanism having a plurality of direction designation positions uniformly spaced apart on two concentric circles, the pointer mechanism being capable of detecting each of the direction designation positions stepwise when tilted from a center position in radial direction.

In the Japanese letter input unit, the direction designation unit is capable of being switched between a column input mode and a row input mode in dependence on two different tilting angles, effect column input when tilted by small angle, effects row input when tilted by large angle, effects column determination when tilted to the large angle during the column selection in the small angle tilted state, effects row selection when tilted to the large angle once again, effects row determination when subsequently returned to the center position, and effects input of a Japanese kana letter by combining the determined column and row.

In the Japanese letter input device, the direction designation unit inputs a consonant of the Japanese kana letter set at the time of the column input, and inputs a vowel of the Japanese kana letter set at the time of the row input.

In the Japanese letter input device, the direction designation unit inputs letters in a romaji alphabet letter set at the time of the column input, and inputs the orders of the inputted letters at the time of the row input.

The Japanese letter input device further comprises a button or like switch for switching a letter input operation and a cursor operation of the direction designation unit over to each other.

In the Japanese letter input device, the direction designation can be switched to set up a cursor movement mode and a display scroll mode in dependence on angles of tilting it when used for the cursor operation, the cursor movement mode being set up by tilting the unit by small angle, the display scroll mode being set up by tilting the unit by large angle.

In the Japanese letter input device, when the direction designation unit is used for the cursor operation, the extent of movement of cursor is changed according to the tilting angle of the pointer for inputting commands concerning the display operation.

In the Japanese letter input device, the direction designation unit includes an elastic member to let a tilting angle of the pointer be known with a feel of click.

In the Japanese letter input device, the direction designation unit has a structure that the user is given a feel of click whenever the pointer being circumferentially moved reaches a direction designation position.

Other objects and features will be clarified from the following description with reference to attached drawings.

BRIEF DESCRIPTION OF THE DRAWINGS

FIGS. 1(a) and 1(b) are a block diagram and a drawing showing direction designation points for showing an embodiment of the present invention;

FIGS. 2(a) and 2(b) are output examples of the direction designation unit for binary and hexadecimal systems;

FIGS. 3(a) and 3(b) are visual representation of processes of movement of the stick or direction pointer of the direction designation unit;

FIGS. 17(a) and 17(b) to 19(a) to 19(d) show various examples of the direction designation unit;

FIGS. 22(a) to 22(e) are perspective views of the stick-like direction designation unit in the embodiment;

FIGS. 24(a) and 24(b) show examples of the direction designation of the output data of direction designation unit;

FIGS. 25(a) and 25(b) illustrate the manner of the cursor movement obtained by the small angle tilting of the input part and the display scrolling mode set up by the large angle tilting of the input part.

PREFERRED EMBODIMENTS OF THE INVENTION

Figure 4:
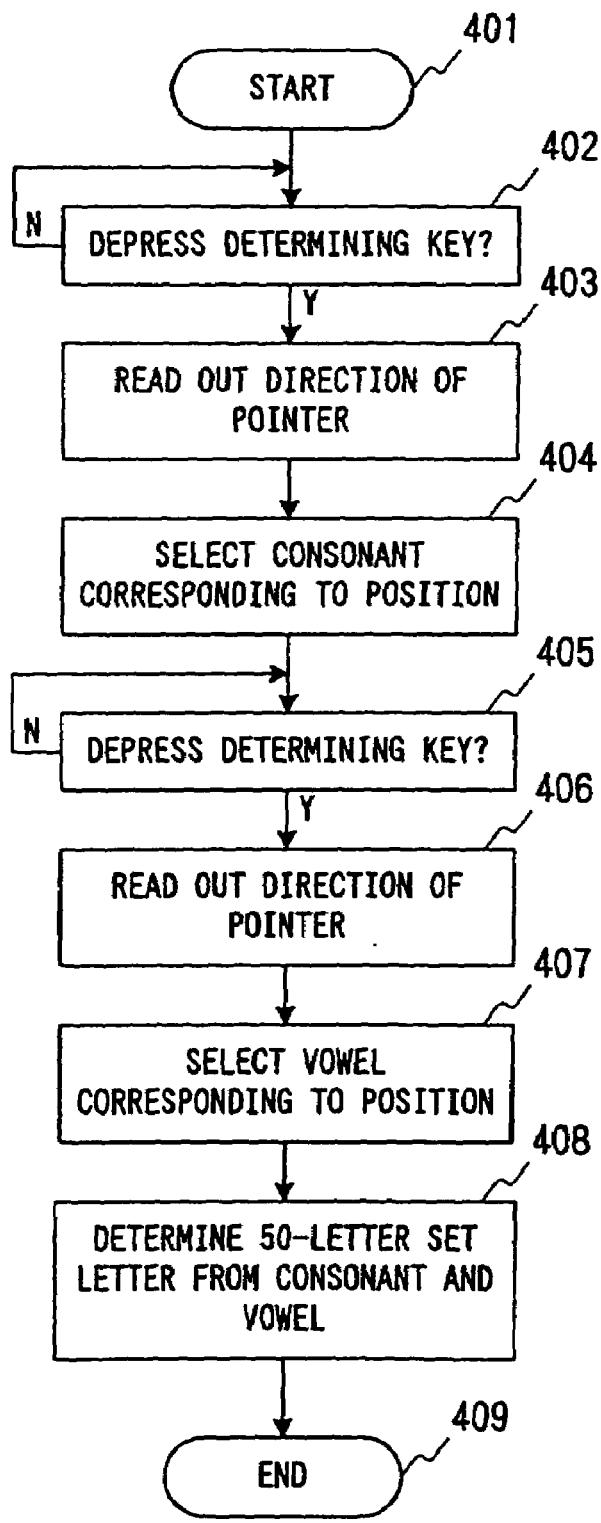
FIGS. 4(a) and 4(b) are flow charts representing routines of the information processing unit in response to corresponding to movements of the pointer of the device.
Figure 4:
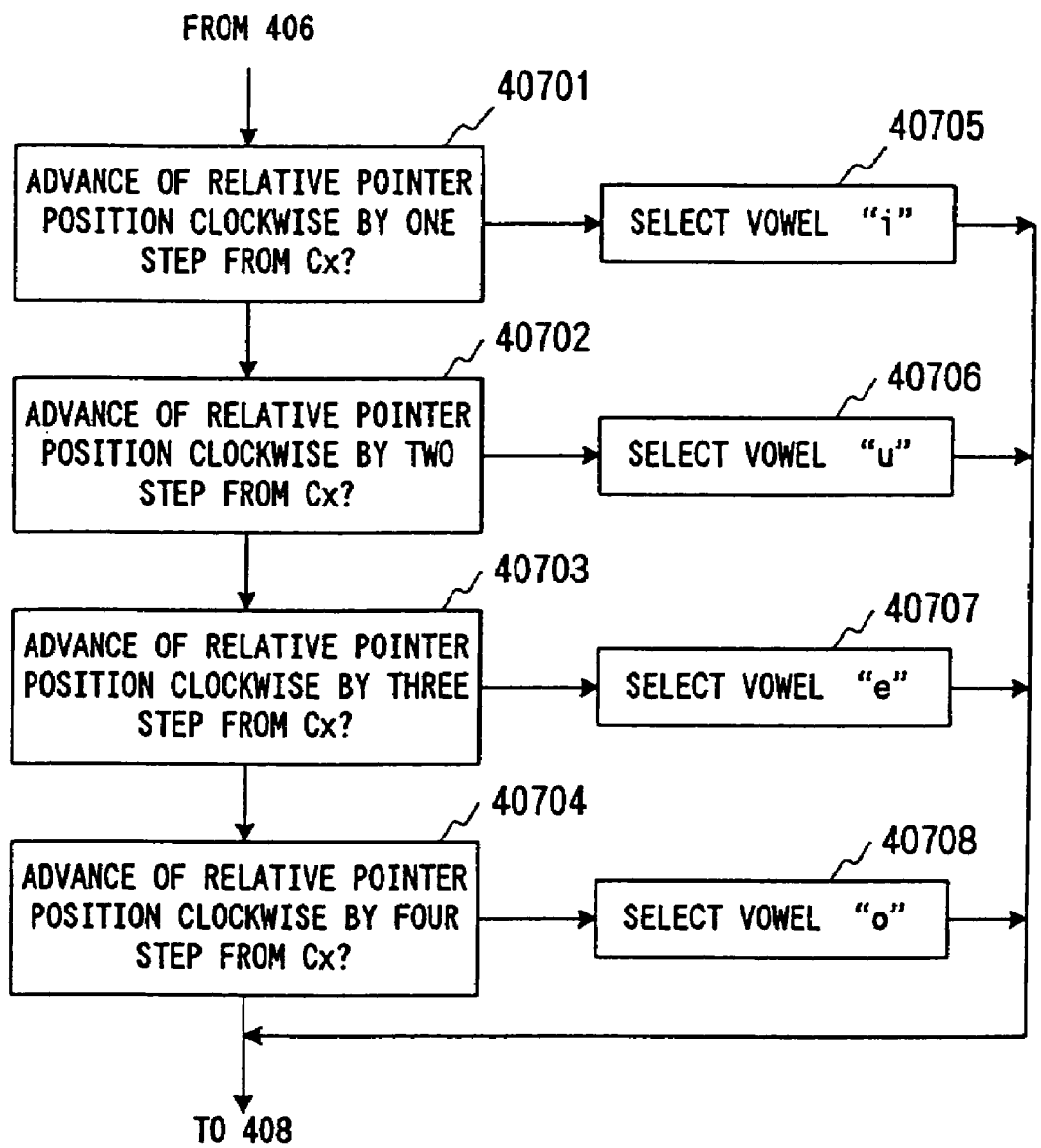

Preferred embodiments of the present invention will now be described with reference to the drawings.

FIGS. 1(a) and 1(b) are a block diagram showing an embodiment of the present invention and a drawing showing direction designation points.

Referring to FIGS. 1(a) and 1 (b) the illustrated embodiment of the present invention is a Japanese letter input device for a portable terminal, which comprises a direction designation unit 10 including a stick or like pointer 11 capable of being moved from center position C0 to any of 12 circumferentially spaced-apart direction designation points C1 to C12 and outputting position data by detecting the position of the stick 11, a data processing unit 20 for selecting a specific letter upon a change in the output of the direction designation unit and outputting a code of the selected letter, a memory 21 for storing processing programs to be executed by the data processing unit, and a display unit 30 for displaying the letter inputted by the data processing unit and also operational instructions or the like. By moving the stick 11 from the center position to any one of the direction designation points C1 to C12, the data processing unit 20 determines a consonant. By subsequently moving the stick 1 circumferentially, the unit 20 selects a vowel. Then, by returning the lever 11 to the center position, a letter is determined and inputted. It is possible to provide a determining key 5 for determining consonants and vowels.

A letter set that is provided has M columns and N rows. Practically, $N \geq M$, although $N \leq M$ is possible. It is preferable to first designate a column and then designate a row.

A one-to-one correspondence between the direction designation points of the direction designation unit and Japanese kana letter consonants is provided. When a specific direction is designated, it is shown that the corresponding consonant is selected, whereby the consonant of the Japanese kana letter to be inputted is determined. When the circumferential position output of the direction designation unit is changed with a change in the position data output of the unit from the position, at which the consonant is determined, a vowel selection mode is set up, in which a vowel is inputted. A letter in the 50-letter set is inputted as the combination of the consonant and the vowel.

In a device having a redundant space, a determining key for determining a consonant and a vowel may be provided and depressed to determine a letter when a consonant and a vowel to be inputted are selected in the letter selection mode.

In a device which has no space for providing a determining key, the determination of a consonant and vowel is made in the following way. A consonant is determined when a corresponding direction from the center axis of the direction designation unit is designated by the stick. A vowel is selected with a subsequent circumferential movement of the stick. Then, determination of a vowel and input of a letter are done with the returning of the stick to the center position.

As shown above, in this embodiment the selection of a consonant and a vowel is made sequentially by the direction designation switch, which can detect designated directions, and a Japanese kana letter is inputted as the results of selection. Thus, unlike a system using a touch panel, no writing pen need be used, and also it is possible to reduce the space used for the device. Furthermore, unlike the case of utilizing a ten key set for the letter input, there is no need of allotting a single button switch to a plurality of letters, and it is thus not necessary to input letters one by one with a ten key set.

Moreover, once a position corresponding to a consonant have been memorized, a vowel can be inputted with circumferential movement of the direction designation device, thus permitting fast letter input.

Figure 20:
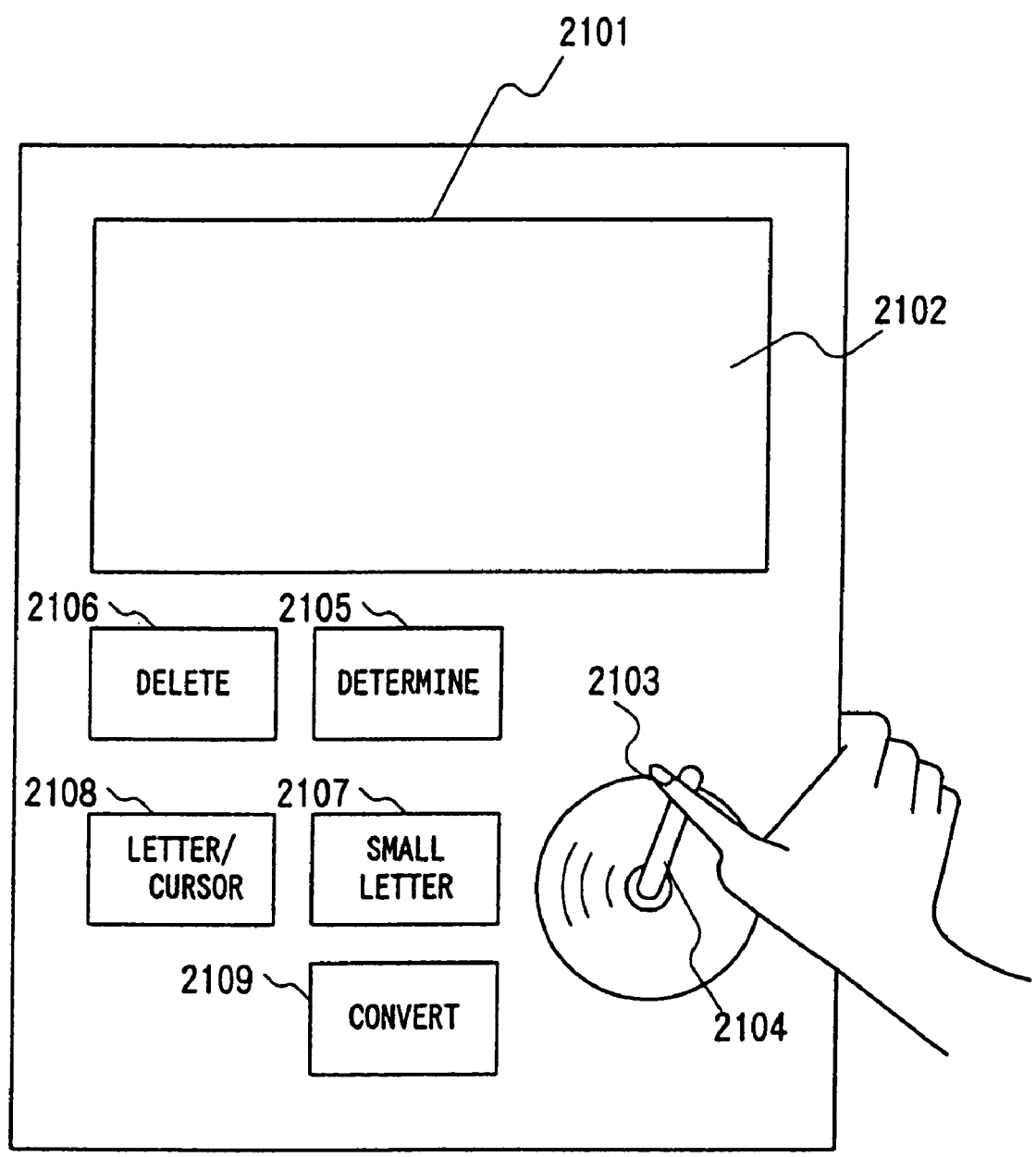
FIG. 20 shows an embodiment of the device according to the present invention.

The constitution of the embodiment of the present invention will now be described with reference to the drawings. FIG. 20 shows an embodiment of the device according to the present invention.

The illustrated embodiment is a Japanese letter input device, which comprises a display unit 2101 for displaying application instructions and also letters to be inputted, a function display unit 2102 provided within the screen of the display unit for displaying various functions and states of the device, a direction designation unit 2103 for designating a direction when turned down or tilted and also causing such operations as selection of a letter to be inputted, movement of a cursor displayed on the screen and scrolling of the display, a stick 2104 operable by the user for determining a direction, a determining key 2105 for determining a selected letter to be inputted and also making other determinations, a deleting key 2106 for deleting erroneous letters at the time of the letter input, a letter/cursor selection key 2108 for switching a cursor display function and a letter input function of the direction designation unit 2103, and a small letter size key 2107 for inputting small size letters.

A feature of this embodiment resides in that Japanese letters can be easily selected and determined by using a stick capable of designating two-dimensional directions or the direction designation unit 2103 which is pad-like in form. The direction designation unit is adapted to show that it is in its center position when nothing is done and directly designate each direction from the center position. The unit can further circumferentially move the direction designation position from any one of such positions.

FIG. 1(b) is a view showing directions to be detected by the direction designation unit and allotment of consonants to directions for inputting letters according to direction designations in this embodiment.

In this letter input method, only the consonants in the 50-letter set are directly designated among the 50-letter kana letter set. That is, only at least 10 different directions need be able to be designated. However, where 360 degrees is divided into 10 divisions, person's intuitive direction designation, such as upward, downward, leftward and rightward, is thought to be rather difficult. For this reason, the 360 degrees is divided into 12 divisions for the direction designation. The division into 12 divisions provides two redundant direction designation points. These two points may be allotted to other functions.

For the sake of the description of the direction designation, symbol C0 is allotted to the center position, and symbols C1 to C12 are allotted to the individual directions circumferentially spaced apart clockwise.

At position C0 the direction designation unit provides no output, i.e., the unit is in its neutral state. The positions C1 to 12 are spaced apart circumferentially clockwise. These positions are allotted to Japanese kana letter consonants as follows.

C1 to A, C12 to K, C11 to S, C10 to T, C9 to N, C8 to H, C7 to M, C6 to Y, C5 to R, and C4 to W.

This allotment is an example of Japanese kana letter consonant mapping with respect to directions, and the above positions and arrangement order of the consonants are by no means limitative. An alternative example may be C1 to A, C2 to K, C3 to S, C4 to T, C5 to N, C6 to H, C7 to M, C8 to Y, C9 to R, and C10 to W.

For manufacturing the direction designation unit as actual hardware, some means is necessary for outputting direction data. Several direction output interfaces are conceivable, and where position contact data is digitalized for hardware simplification, the following two different methods are conceivable.

FIG. 2(a) illustrates one of the conceivable methods. The direction designation unit is adapted to output 12-bit data representing the respective 12 different directions. The least significant bit (LSB) is allotted to C1, and the most significant bit (MSB) is allotted to C12. When a direction is selected, the corresponding bit is made to be "1". The center position C0 is represented by all "0" bits. For example, when C10 is selected, the direction designation unit outputs data of "001000000000". With C0, the output data is "000000000000".

In the other conceivable method, the direction designation unit is adapted to represent the 12 different directions with 4-bit state numbers.

As shown in FIG. 2(b), the direction designation unit can output position numbers 0h to Ch representing the respective positions C0 to C12. "h" in the position numbers represent that the hexadecimal system is adopted.

In the case of FIG. 2(b), unlike the case of FIG. 2(a) in which at least 12 hardware lead wires are necessary, at least 4 lead wires may be sufficient, thus permitting reduction of the quantity of lead wires of an interface with a CPU or the like for reading the output.

On the merit side of the case of FIG. 2(a), switch contact states of the direction designation unit are directly outputted, thus dispensing with an encoder or like extra circuit.

The letter input device is constructed to be of an integral structure comprising a direction input unit, a data processing unit for letter input and other processes and a display unit for displaying the result of the letter input.

In both the above data output methods, the data processing unit reads the data output of the direction input unit and recognizes a consonant corresponding to the read-out data as consonant data of a letter to be inputted.

In addition, the direction designation unit is adapted to give user a sense of mechanical click while it is circumferentially moved, thus permitting the user to sense the extent of movement when selecting a vowel.

The basic operation of the embodiment will now be described with reference to FIGS. 1(a) and 1(b) to 3(a) and 3(b).

As shown in FIG. 1(a), in the direction designation unit, which serves as a position data output unit, 360 degrees around center reference point C0 is divided into 12 equal divisions to define direction designation points C1 to C12 cirfcumferentially uniformly spaced apart clockwise. When a direction is designated, the unit can detect it and output the corresponding one of the position data C1 to C12 representing a first or a second direction designation point. When the center position of the unit is designated, the unit outputs data C0. In the case of FIG. 2(b), the unit outputs representing respective positions are hexadecimal data.

The data processing unit receives the output data of the direction designation unit, and analyzes the position data to generate data for executing the letter input. On the basis of the data thus generated, the unit inputs Japanese letters.

FIGS. 3(a) and 3(b) are visual representation of processes of movement of the stick direction pointer of the direction designation unit. FIGS. 4(a) and 4(b) are flow charts representing routines of the information processing unit in response to corresponding to movements of the pointer of the device.

In this embodiment of the letter input device, letters may be inputted with or without a determining key. These two methods are based on different letter input algorithms.

The routine in the case of using the determining key will first be described with reference to FIG. 3(a).

Referring to FIG. 3(a), it is assumed that the pointer of the direction designation unit has been moved from center position C0 ① along route ② to position C9 and thence successively moved circumferentially along route ③ to position C10, then along route ④ to position C11, thence long route ⑤ to position C12 and thence along route ⑥ to position C13.

When the user is doing nothing, i.e., with the pointer at the center position ①, the direction designation unit is outputting data "0h", representing the position C0 to the data processing unit.

With subsequent movement of the pointer along route ② to the position C9, the unit outputs data "9h" of the first direction designation position. When the data processing unit reads out "9h", it causes display on the display unit that consonant "N" has been selected, and notifies the user that "Na column" has been selected. When the determining key is depressed at this time, the unit determines that the first direction designation position is allotted to the "Na row" consonant.

If the determining key is not depressed, the consonant selection mode remains, and the pointer is moved along route ③ to position C10. As a result, the direction designation unit outputs data "Ah". If the determining key is not depressed yet, the consonant selection still remains. At this time, the data processing unit reading "Ah", causes display on the display unit that consonant "T" has been selected, thus notifying the user that "Ta column" has been selected. With subsequent movement of the unit lever along route ④ to position C11, the direction designation unit outputs data "Bh". The data processing unit thus reads out "Bh" and causes display on the display unit that consonant "Sa" has been selected, thus notifying the user that "S column" has been selected.

When the determining key is depressed with the pointer of the direction designation unit at the position C11, the data processing unit reads out this depression of the determining key, and determines the consonant at the first direction designation position, i.e., "Sa row" consonant.

The row of the first direction designation position that has been determined may be displayed in various ways. As an example, as shown at 1401 to 1406 in FIG. 13(a), a consonant is displayed as an alphabet letter at the time of its selection, and at the time of its determination a kana letter is displayed. Alternatively, the representation may be made in different ways when a consonant is selected and when it is determined. For example, the cursor display may be changed from white conversion to cursor brink. When the row concerning the consonant of C11 is determined, it is notified by displaying letter "Sa".

After the determination of the first direction designation position, by moving the direction designation unit pointer along route ⑤ to the position of C12 the direction designation unit outputs data "Ch", and letter "Shi" is displayed to notify the user that this letter has been selected.

By depressing the determining key with the pointer at the position C12, this position thus becomes the second direction designation position. The data processing unit reads out this depression of the determining key, and determines a vowel. Thus, the unit determines letter "Si" to be inputted, and notifies the user that this letter is inputted.

It is now assumed that the pointer is moved along route ⑥ to position C1 without determination of the first direction designation position. In this case, the data processing unit executes the same process as the first consonant selection process, and notifies the user that "A row" has been selected.

By subsequently returning of the pointer along route ⑦, past position C2 and along route ⑧ to the position C0 without depression of the determining key for determining the second direction designation position, the letter selection mode is released.

FIGS. 4(a) and 4(b) illustrate the above operations. Specifically, FIG. 4(a) is a flow chart showing a main routine, and FIG. 4(b) is a flow chart showing in detail a step 407, namely "SELECT VOWEL CORRESPONDING TO POSITION".

Referring to FIG. 4(a), when the routine is started, the direction designation unit monitors the depression of the determining key (step 402). When the determining key is depressed for the first time with the pointer at the first direction designation position, the data processing unit reads out the direction of the pointer from the center position (step 403), and selects and causes conversion display of a corresponding predetermined consonant (step 404). Then, depression of the determining key this time for determining the second direction designation position is monitored (step 405). When the determining key is depressed again for the second direction designation position, the data processing unit reads out the direction of the second direction designation point at this time (step 406).

The data processing unit then determines the difference between the direction of the first direction designation position, which has been read out in the step 403 after the detection of the depression of the determining key for the first time, and the direction of the second direction designation position, which has been read out in the step 406 after the detection of the second depression of the determining key, and selects a vowel corresponding to the determined difference (step 407).

As shown in FIG. 4(b), denoting the direction read out in the step 403 after the detection of the first depression of the determining key by Cx, when the direction read out in the step 406 after the second key depression is advanced clockwise by one step from Cx (step 40701), the data processing unit selects the second row vowel "i" (step 40705). When the read-out direction is advanced clockwise by two steps (40702), the unit selects the third row vowel "u" (step 40706). When the direction is advanced clockwise by three steps from Cx (step 40703), the unit selects the vowel "e" (step 40707). When the direction is advanced by four steps (step 40704), the unit selects the vowel "o" (step 40708). With the selected consonant and vowel, the data processing unit determines a letter, and inputs the same to a succeeding device (step 408).

As is seen from the above routine, at the time of the depression of the determining key for the first direction designation position the data processing unit reads out the output of the direction designation unit and determines a consonant, and at the time of the second depression of the determining key for the second direction designation position it reads out the direction designation unit output again and determines a vowel, thus determining a letter in the 50-letter set. When the direction designation unit output is restored to C0 at any point in the routine, the routine goes back to "START" (step 401).

Now, the routine in the case when the determining key is not used will be described with reference to FIG. 3(b) and 5.

Referring to FIG. 3(b), it is first assumed that the output of the direction designation unit represents position C0 ①, i.e., the unit is in the initial state. This corresponds to "START" (step 501) in FIG. 5.

It is then assumed that the output of the direction designation unit has been changed from C0 to Cx, i.e., it is detected that the unit lever has been moved from the position C0 along radial route ② to position C11 (step 502). At the time of detection of this first change, "determination of a consonant corresponding to Cx" is done (step 503).

In FIG. 3(b), C11 is allotted to "S", and this means that "Sa column" in the Japanese letter set has been selected.

By subsequently moving the counterclockwise along circumferential route ③ to position C12, the data processing unit reads out the output data of the direction designation unit, and causes display of letter "Sa". By subsequently moving the pointer along route ④ to position of C1, letter "Si" is displayed. It will be seen that a letter which is presently selected is shown to the user. This corresponds to "SELECT VOWEL CORRESPONDING TO POSITION" (step 505).

It is now assumed that the pointer has been moved circumferentially along route ⑤ to cause the direction designation unit to output data C2 and then moved along route ⑥ to cause the direction designation unit to output 9 data C0. In this case, the vowel corresponding to the position C2 before the movement of the pointer to the position C0 is selected, and letter "Su" is determined to be inputted.

Figure 5:
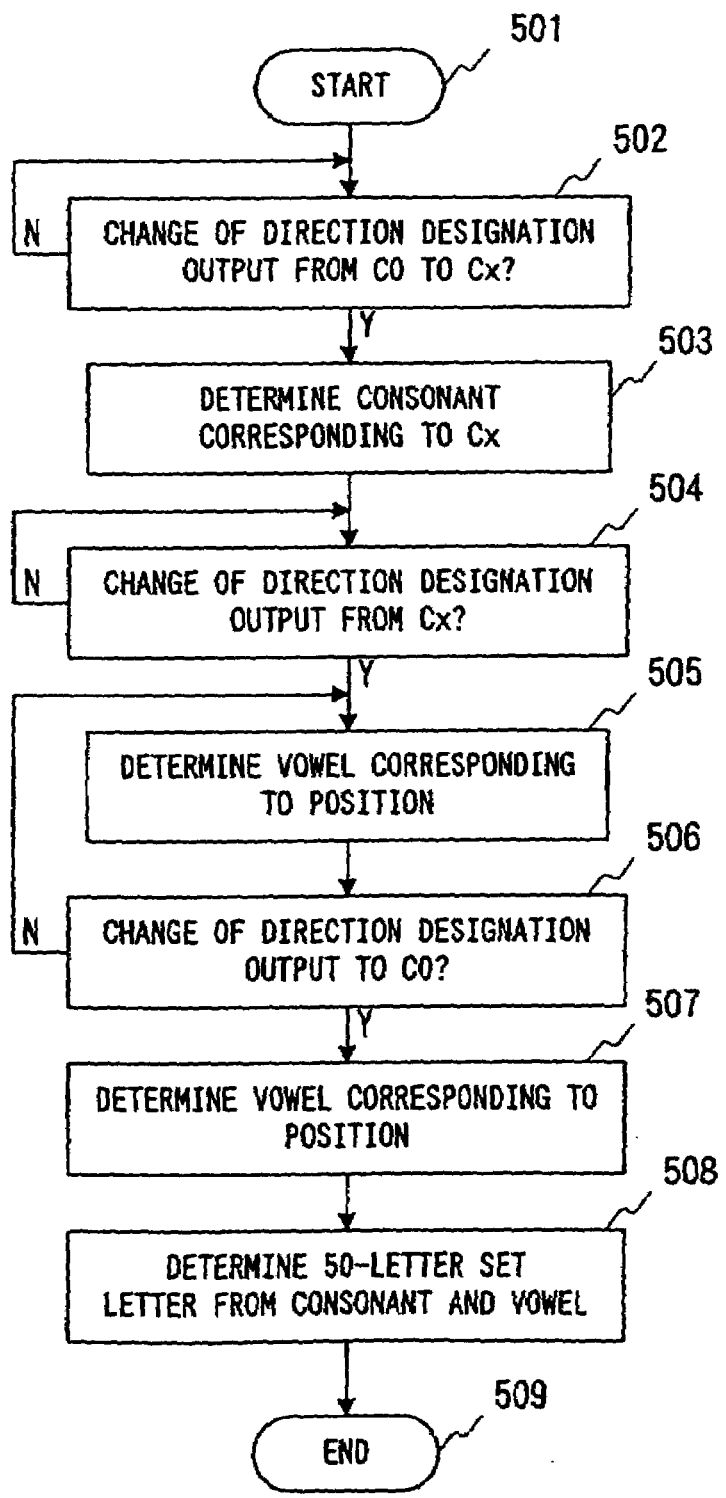
FIG. 5 is a flow chart showing a basic input operation without use of determining key.

In FIG. 5, the above operation is shown as a routine part constituted by "HAS DIRECTION DESIGNATION UNIT OUTPUT BEEN CHANGED TO C0 ?" (step 506), "DETERMINE VOWEL CORRESPONDING TO POSITION (step 507) and "DETERMINE 50-LETTER SET LETTER FROM CONSONANT AND VOWEL" (step 508). The position in "DETERMINE VOWEL CORRESPONDING TO POSITION (507) is not the center position C0 but corresponds to direction designation unit output data C2 right before the returning of the pointer to the center position C0.

In this example, the position C2 is reached by three-step clockwise movement of the pointer from the position C11, and thus vowel "u" is selected. That is, letter "Su" is inputted.

For the above processes, a software or hardware buffer is necessary for storing position data preceding by one step. As means for reading out the hardware device output when desired, in addition to means for reading out data by hardware poring, it is conceivable to use a timer for reading data as follows.

Two different means are conceivable to read direction output unit output data by using a timer. In one of such means, the data processing unit uses an internal timer for reading out the output data at a predetermined interval. In the other means, the direction designation unit uses a timer for taking out direction data at a predetermined time interval from a given time instant and is adapted to generate an interruption transmitted to the data processing unit after taking out the direction data. When the data processing unit receives the interruption, it reads out the direction designation unit output to obtain the direction data.

Figure 6:
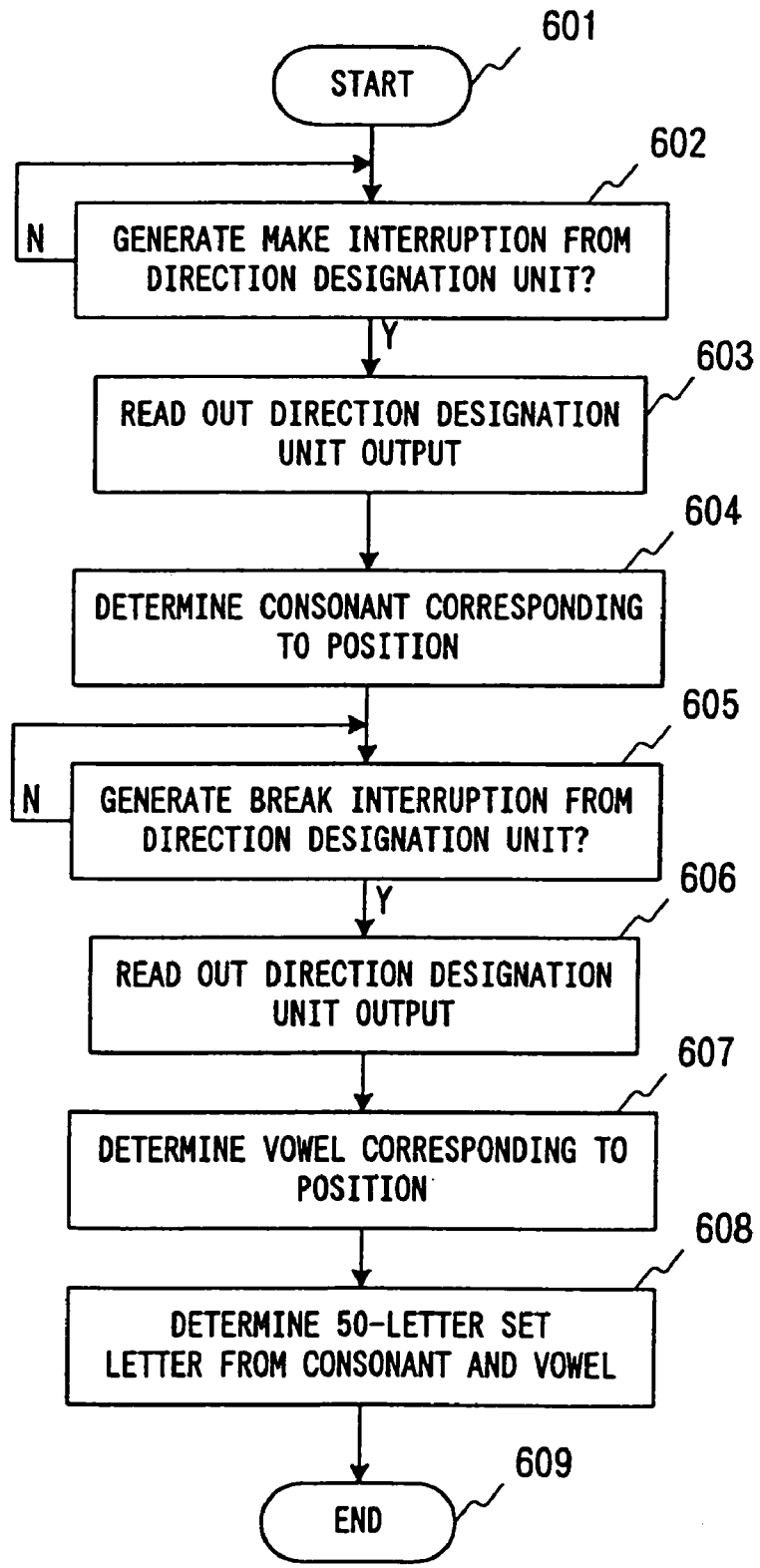
FIG. 6 is a flow chart showing a basic input operation with use of interruption key.

Now, the routine in the case of determining a consonant and a vowel without use of any determining key but by having resort to interruptions from the direction designation unit, will be described with reference to FIG. 6.

This routine is not based on the method using a timer as described above, but it is a means for generating interruptions according to changes in the output data of the direction designation unit.

Initially, the routine is at "START" (step 601), and the device is waiting for detecting an interruption from the direction designation unit.

When a make interruption from the direction designation unit is generated (step 602), the data processing unit reads out the direction designation unit output (step 603), and determines a consonant corresponding to the output data position (step 604).

Referring to FIG. 3(b) for this routine, the make interruption is generated when the output of the direction designation unit is changed as a result of movement of the pointer from the center position ① along radial routine ② to position C11 (step 602).

The data processing unit reads out the direction designation unit output, i.e., output data of C11, at this time (step 603), and determines consonant "S" (step 604).

Subsequently, when a break interruption is generated from the direction designation unit (605), the data processing unit reads out the direction designation unit output (step 606), and determines a vowel corresponding to the output data position (step 607), thus determining a letter in the 50-letter set (step 608).

The break interruption is generated from the direction designation unit when the output thereof is restored to the position C0 from any one of the positions of C1 to C12.

In the case of FIG. 3(b), this interruption is generated when the unit lever is moved along route ⑥ leading to the center position. The direction designation unit output that is read out when the break interruption is generated, represents the position C2 immediately before route ⑥.

Subsequent "determination of vowel corresponding to position" (step 607) and "determination of a 50-letter set letter from the consonant and vowel" (step 608), are done in the same ways as in the steps 507 and 508 in FIG. 5, respectively.

Figure 26:
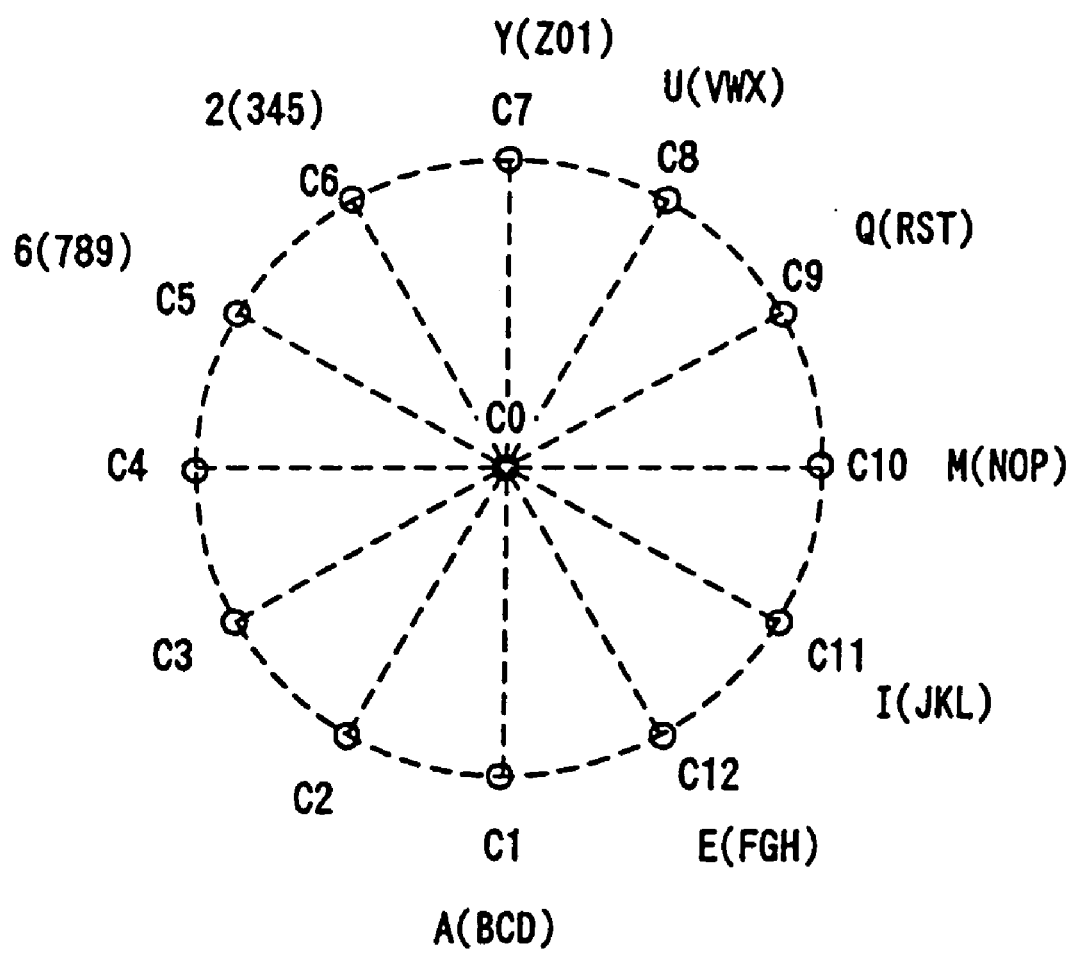
FIG. 26 shows how directions for inputting Arabian numerals other than the kana letters are allotted to the numerals.

FIG. 26 shows how directions for inputting Arabian numerals other than the kana letters are allotted to the numerals.

In the Figure, each direction is allotted to corresponding letters in parentheses. For example, direction designation position C1 is allotted to a set of four letters A to D. This allotment is represented by "A(BCD)" with A as typical letter. Likewise, C12 is allotted to "E(FGH)", C11 to "I(JKL)", C10 to "M(NOP)", C9 to "Q(RST)", C8 to "U(VWY)", C7 to "Y(Z01)", C6 to "2(345)", and C5 to "6(789)".

First, when a particular direction is designated, the first typical letter of the corresponding letter set is displayed on the display unit. That is, the displayed letter represents the selected Arabian numeral letter set. For example, with the designation of C8 letter "U" is displayed on the display unit. This letter "U" may be displayed as a white conversion letter or with like means to indicate that the letter prevails as selected letter.

The pointer of the direction designation unit may then be moved either forward or backward, i.e., either clockwise or counterclockwise. By moving the pointer counterclockwise, other letter sets are selected afresh. By moving the pointer clockwise, letters in the first selected letter set are selected.

For example, by moving the pointer counterclockwise from the position C8 to position C7, "Y" and "2" are successively displayed in the mentioned order on the display unit.

Then by moving the pointer clockwise by one step, "3" is displayed, and moving by two steps "4" is displayed. Then by returning the pointer to the center of the direction designation unit, letter "4" is determined and is inputted. In the above way, Arabic numerals are inputted.

Likewise, it is possible to allot some directions to symbol sets. In this case, it may be arranged that by moving the pointer from the center position in a certain direction, a symbol set is selected, and by subsequently moving the lever circumferentially a particular symbol in the symbol set may be inputted.

Direction designation positions C2 and C3 which are not allotted to any letter, may be allotted to the selection of hiragana letters, katakana letters, Arabic numerals and symbols to permit selection and determination of such a letter set in the same way as letter input.

In this embodiment of the Japanese letter input device, the input state of inputted letters is displayed on the display device 2101 by operating the direction designation unit 2103. It is thus possible to input letters while confirming the same.

Also, the determining key used for the letter input may also be used for determining a particular letter among a plurality of displayed letters and also selecting and determining a conversion letter in kanji conversion. In the letter input in the routines as shown in FIGS. 5 and 6, however, it is of course that the determining key 2105 need not be used.

Figure 21:
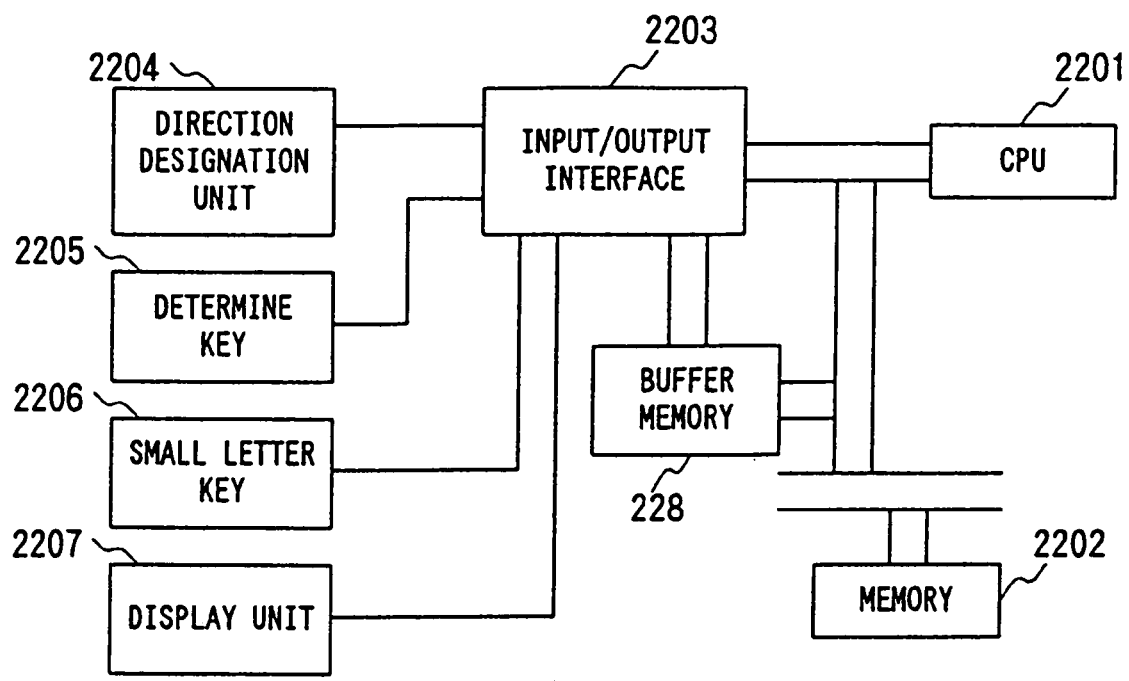
FIG. 21 is a circuit diagram showing the construction of one embodiment of the present invention.

FIG. 21 is a circuit diagram showing the construction of one embodiment of the present invention.

The circuit of this embodiment basically comprises a data processing unit including a part for effecting the letter input and a part for selecting and determining letters to be actually inputted according to the data inputted to the first-mentioned part, and a display unit for displaying the result of process in the data processing unit.

Specifically, the circuit comprises a direction designation unit 2204 mainly used for the letter input, a determining key 2205 for determining letters to be inputted and also determining some functions, a small letter key 2206 used when it is desired to input small letters, a display unit 2207 for displaying the content of the result of process in the data processing unit, such as the letter input state, determined letters, etc., a CPU 2201 for processing data of the direction designation unit, the determining key and the small letter key and executing letter input programs, a memory 2202 in which process programs to be executed in the CPU and tentative data during processes are stored, an input/output interface 2203 for taking interface between the CPU and the input and display parts, and a buffer memory 2208 for temporarily storing output data of the direction designation unit. The buffer memory 2208 may be dispensed with so long as the CPU has sufficient data processing speed when taking out data.

Figure 16:
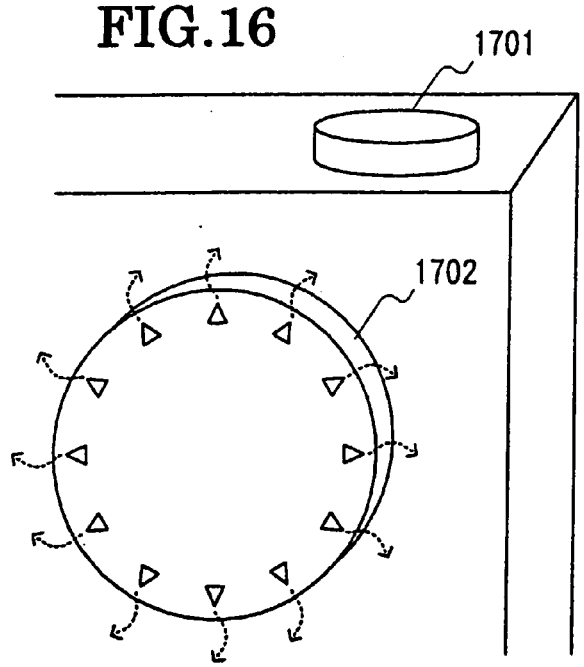
FIG. 16 shows an example of the construction of the direction designation unit according to the present invention.

FIG. 16 shows an example of the construction of the direction designation unit according to the present invention.

As shown, the direction designation unit 1702 comprises a disc-like direction input part with the periphery thereof uniformly divided into 12 equal divisions and a determining key 1701 for inputting instructions of determination. The divisions of the direction input part are tiltable in the directions of arrows. When any one of the divisions is tilted, a corresponding direction is detected to provide corresponding data. This part thus can provide 12 different direction data pieces. The part, i.e., the direction designation unit, provides output data of C0 as shown in FIG. 1 when it is released from hand. Where the direction input part and the determining key 1701 of the direction designation unit 1702 are disposed in such position relation as to operate the direction input part with the thumb and effect letter determination with the index finger as shown in FIG. 16, single hand input of letters is made possible.

FIGS. 17(a) and 17(b) to 19(a) to 19(d) show various examples of the direction designation unit.

The direction designation unit shown in FIGS. 17(a) and 17(b) comprises a disc-like direction input part 1802 having a central determining key 1801. The direction input part 1802 is operable by depressing 12 divisions of its periphery with its center as reference. It is thus possible to designate 12 different directions.

With its center set as reference, the unit can provide only a single direction designation point by a single depressing operation. The central determining key 1801 is operable for letter determination and other determining functions in application.

The direction designation unit shown in FIGS. 18(a) and 18(b) comprises a stick-like direction input part 1902, a determining key 1901 provided centrally thereof, and a support 1093 supporting the components 1901 and 1902.

The unit can designate a direction by tilting the stick-like direction input part 1092 as shown by phantom lines 1094 and 1905.

FIG. 18(b) is a perspective view showing that this stick-like direction designation unit can designate any one of a plurality of designation directions set by dividing 360 degrees.

The direction designation unit shown in FIGS. 19(a) to 19(d) comprises a stick-like direction input part 2001 and a support 2002 supporting the same. The direction input part 2001 is in the form of a stick like that in the example of FIGS. 18(a) and 18(b). This direction designation unit, however, can designate a direction by axially depressing the stick instead of a projecting button-like determining key.

Again the unit can designate a direction by tilting the stick 2001 as shown by phantom lines 2003 and 2004.

As shown in FIGS. 19(b) and 19(c), the unit can designate any one of a plurality of designation directions set by dividing 360 degrees.

FIG. 19(d) shows the structure of the stick 2001. This structure is basically the same as that shown in FIGS. 18(a) and 18(b), and comprises a slidable operating member 2008 covering a switch 2009, which has signal contacts which are turned on by depressing the operating member, and a support part 2010 supporting the operable member 2008. A lead wire leading to a contact of the switch 2009 is passed through the support part.

Figure 13:
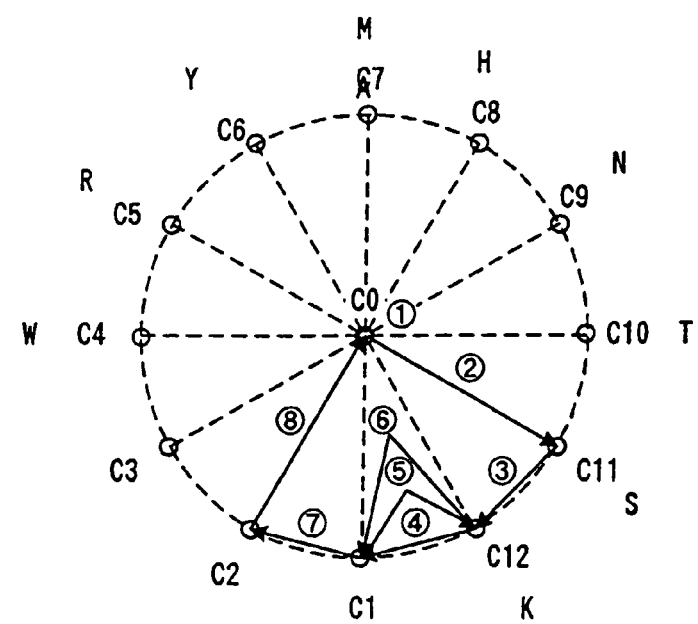
FIGS. 13(a) and 13(b) are views showing successive displays on a display screen and route of changes in the direction designation point position of an operation 1 according to the present invention.

The operation of the direction designation unit shown in FIGS. 20 and 21 will now be described in connection with a case of sequence of inputting kana letter "Ku" by using the determining key as shown in FIGS. 13(a) and 13(b).

FIG. 13(a) is a view showing successive displays on a display screen of any of the direction designation units shown in FIGS. 17(a) and 17(b) to 19(a) to 9(d) with changes in the direction designation point position in the letter input operation. FIG. 13(b) is a view showing the route of changes in the direction designation point position. As shown in FIG. 13(a), Roman alphabets correspond to Japanese characters.

Referring to FIG. 13(b), when the direction input part of, for instance, the direction designation unit 2103 is at position ① of C0 so that the unit is outputting corresponding data, for instance "Oh", the CPU 2201 is waiting for letter input. At this time, a previous display (1401) on the screen is held without being updated.

With subsequent movement of the direction input part of the unit along route ② to the position of C1, the direction designation unit outputs data of C11, for instance "Bh", to the CPU 2201. As a result, the CPU does consonant selection for the first time. Since "S column" is allotted by C11, letter "S" (1402) is displayed on the display unit 2101.

With subsequent movement of the direction input part along route ③ to the position of C12, the unit outputs data of C12 to the CPU. Since the determining key has not been depressed at this time, the consonant selection mode remains remains. Since "Ka column" is allotted by C12, letter "K" (1403) is displayed on the display unit.

With subsequent movement of the direction input part along route ④ to the position of C1, the unit outputs data of C1 to the CPU. Since the determining key again has not yet been depressed at this time, the consonant selection mode still remains. Since "A column" is allotted by C1, letter "A" (1404) is displayed on the display unit.

With subsequent movement of the direction input part from the position of C1 along route ⑤ back to the position of C12, the unit outputs data of C12. The backward movement of the direction input part is caused by erroneous skipping of the position of a consonant to be selected by the direction input part during the consonant selection. By depressing the determining key with the direction input part at the position of C12, consonant ⑤' is determined.

When the consonant ⑤' is determined, this is shown by replacing the display of letter "K" (1405) on the with Japanese kana letter "Ka" (1406) on the display unit screen. In a "hiragana" letter input state, "*kana*" indicating "hiragana" is displayed on a function display part 2102 of the screen. In a "katakana" letter input state, "kana" indicating "katakana" is displayed on the function display part.

Since the consonant representing a column in the 50-letter set is determined by the position of C12, this position of C12 now constitutes a position to select vowel "a" in the first row of the 50-letter set.

It is now assumed that the direction input part is moved along routes ⑥ and ⑦ to the position of C1 and thence the position of C2.

With the direction input part brought to the position of C1, letter "Ki" (1407) representing the vowel "i" of the 50-letter set second row is displayed on the display unit screen. With the direction input part brought to the position of C2, letter "Ku" (1408) representing the vowel of the third row is displayed.

By depressing the determining key is depressed when the direction input part is at the position of C2, the consonant "K" and the vowel "u" are determined at a time, and letter "Ku" (1409) corresponding ("K"+"u") is determined.

With returning of the direction input part from the position of C2 along route ⑧ to the position of C0, a process of inputting one letter (1410) is ended.

If the direction input part is returned along route ⑦ to C2 and thence along route ⑧ to C0 without second depression of the determining key, the letter input waiting state is set up again without executing the letter determination.

Figure 14:
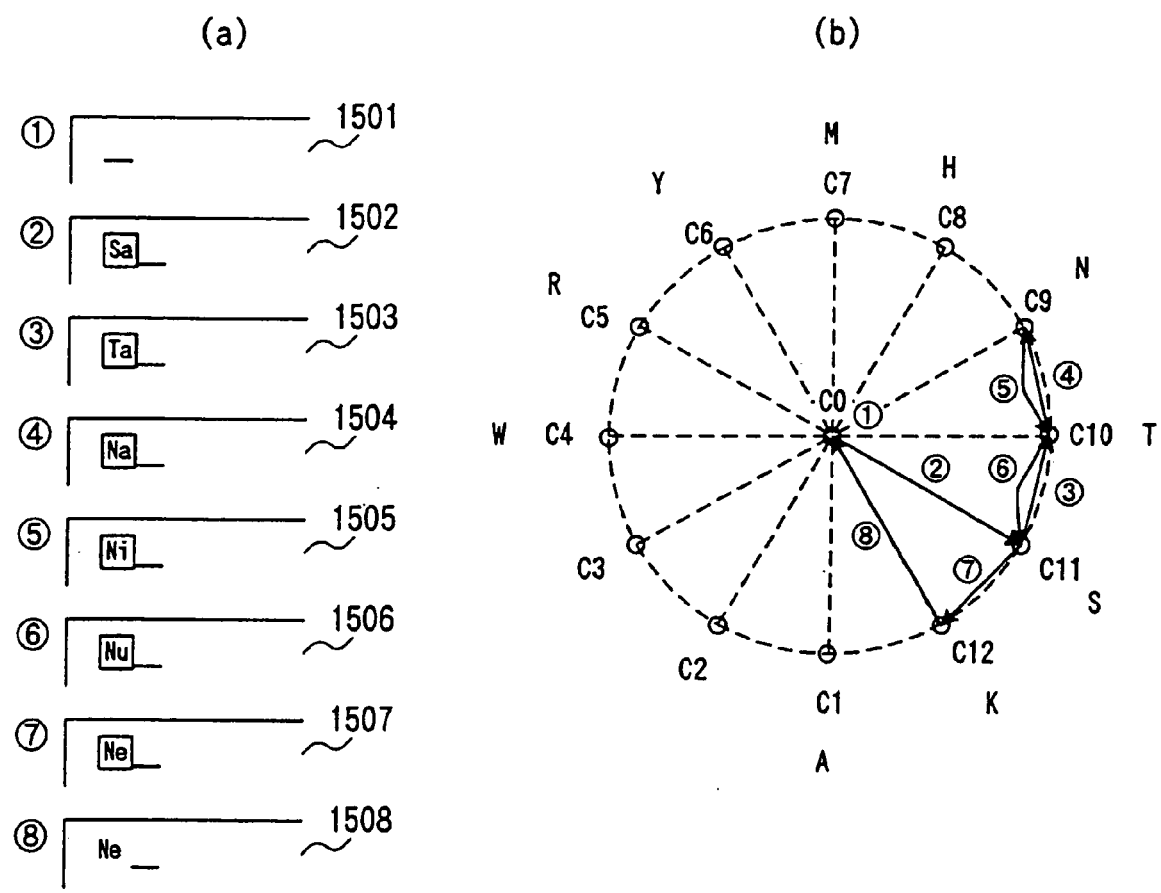
FIGS. 14(a) and 14(b) are views showing successive displays on a display screen and route of changes in the direction designation point position of an operation 2 according to the present invention.

The operation of the direction designation unit in the case of inputting a Japanese letter, for instance kana letter "Ne" without use of any determining key, will now be described in connection with an example shown in FIGS. 14(a) and 14(b).

Initially, with the direction input part of the direction designation unit at the position of C0, the output data of the unit represents C0 and is, for instance, "Oh". In this state, nothing is displayed on the display unit (1501).

It is now assumed that the direction input part has been moved from this position along route ② to the position of C11. In the case of FIGS. 14(a) and 14(b), unlike the case of FIGS. 13(a) and 13(b), a consonant and a vowel are determined without use of determining key but by having resort to the sole movement of the direction input part of the direction designation unit. In this case, a consonant is selected and determined by the position of Cx, to which the direction input part is first moved from C0.

That is, a consonant is selected and determined by any one of the positions of C1 to C12, to which the direction input part is first moved from C0. However, if the consonant at the first position brought to is directly selected and then determined, it is impossible to correct the selected consonant in the event of erroneous consonant selection. Accordingly, it is adapted that circumferentially clockwise movement of the direction input part causes re-determination of a consonant, while clockwise movement causes vowel selection.

Specifically, when the direction input part has been moved along route ② to the position of C11, letter "Sa" (1502) has already been selected. With subsequent clockwise movement of the direction input part along route ③ to the position of C10, letter "Ta" (1503) is selected. With further movement of the direction input part along route ④ to the position of C9, letter "Na" (1504) is selected. At this time, by returning the direction input part to the position of C0 to restore direction designation unit output data "0h", the letter "Na" is determined.

It is now assumed that the direction input part is moved clockwise from the position of C9 along route ⑤ to the position of C10. At the time of the reversal movement from the position of C9, the consonant of "Na column" of C9 is determined. With movement of the direction input part to the position of C10, letter "i" is selected as the second row vowel, and letter "Ni" (1505) is displayed on the display unit. With subsequent movement of the direction input part along route ⑥ to the position of C11, letter "Nu" (1506) is displayed on the display unit. Up to this time, no letter has yet been determined.

With further movement of the direction input part along route ⑦ to the position of C12, letter "Ne" (1507) representing the fourth row vowel is displayed.

Now it is assumed that the direction input unit having been brought to the position of C12 is returned along route ⑧ to the position of C0. With the returning of the direction input part to C0, letter "Ne" corresponding to the position immediately before the returning to C0, i.e., C12 in this case, is determined and inputted.

Figure 15:
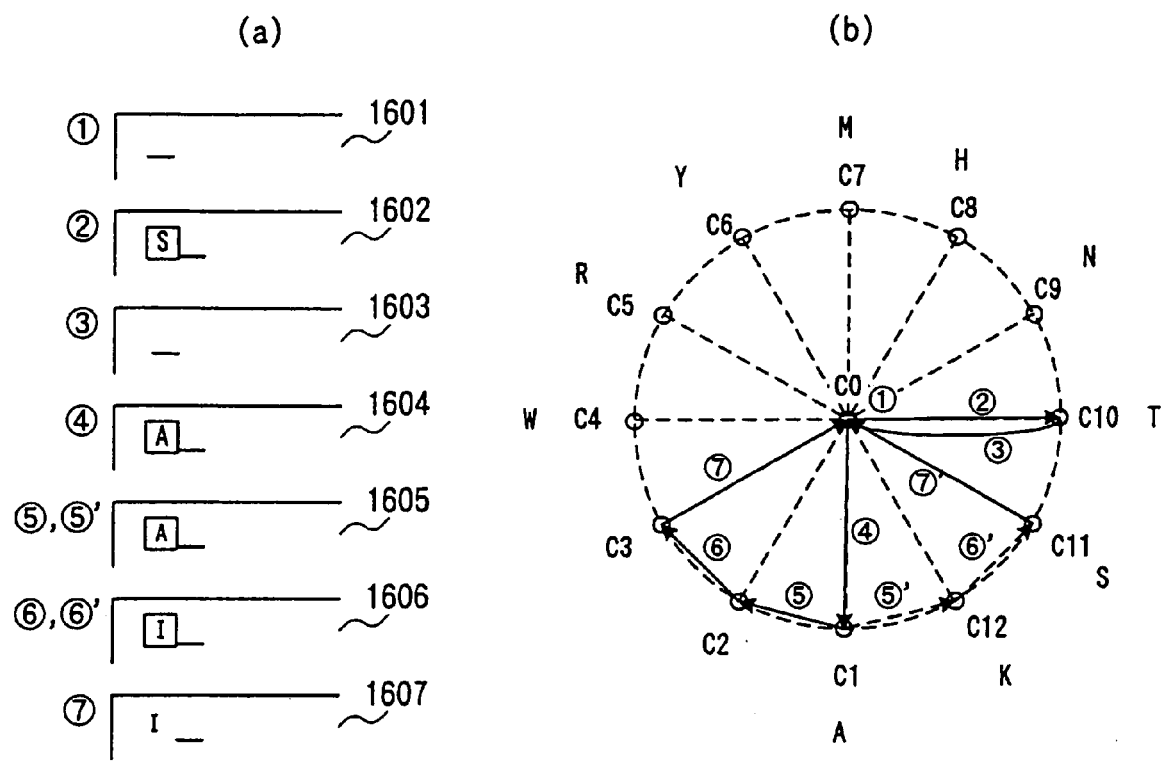
FIGS. 15(a) and 15(b) are views showing successive displays on a display screen and route of changes in the direction designation point position of an operation 3 according to the present invention.

FIGS. 15(a) to 15(b) show a different method of letter input without use of any determining key. This method permits consonant selection afresh when further erroneous consonant selection has been done. In the case of FIGS. 14(a) and 14(b), when the data processing unit reads out the direction designation unit data C0, C10 and C0 successively, it determines and inputs letter "Ta". In the operation of the case of FIGS. 15(a) and 15(b), at such time it is possible to cancel the letter once selected and restore the initial letter input state to permit operation afresh from the consonant selection.

Initially, the direction data input part of the direction designation unit is at the position C0 (1601). It is now assumed that the input part has been moved from this position along route ② to the position C10. At this time, letter "T" (1602) is displayed on the display unit, showing that "Ta column" has been selected.

If it is found that this selection is erroneous, the input part is returned to the position C0 again instead of further moving it circumferentially in the reverse direction. As a result, the initial display (1603) is restored. Then, by moving the input part along route ④ to position C1, letter "A" (1604) is displayed, showing the "A column" has been selected.

By subsequently moving the input part along circumferential route ⑤ or ⑤ to position C2 or C12, letter "A" (i.e., kana letter "A") (1605) is displayed, showing that vowel "a" has been selected. If the input part is then returned past the previous position C1 to the center position C0, the initial input state, i.e., the consonant selection mode, is restored.

Then, by moving the input part to position C1 or C12 and thence along route ⑥ or ⑥' to the next position C3 or C11, letter "I" (i.e., kana letter "I") (1606) is displayed on the display unit, showing that the second row vowel "i" has been selected.

To determine the letter displayed at this time to be inputted, the input part is returned from the position C1 or C11 along route ⑦ or ⑦ to the position C0. As a result, the letter allotted by the position immediately preceding the position C0, i.e., letter "I" (1607) in this case, is determined.

As shown above, although the letter input operations are slightly different in the kind of the direction designation unit and the way of letter correction, in these operations a Japanese letter is inputted in such a manner that a consonant is selected by moving the direction data input part from the center position to a circumferential position and then a vowel is inputted by further moving the input part circumferentially from that position.

A different embodiment of the present invention will now be described with reference to FIGS. 7 and 8.

With a direction designation unit having a determining key, the determination of a consonant and a vowel can be made by utilizing the determining key. However, when it is desired to further simplify the letter input device, it is possible to dispense with the determining key and permit the letter input with the sole direction designation. This is realized by merely refraining from the use of the determining key 2105 shown in FIG. 20 in the letter input.

FIGS. 8(a) and 8(b) are flow charts illustrating a letter input routine, in which the CPU reads out the output data of the direction designation unit and executes the letter input according to the read-out data.

Figure 7:
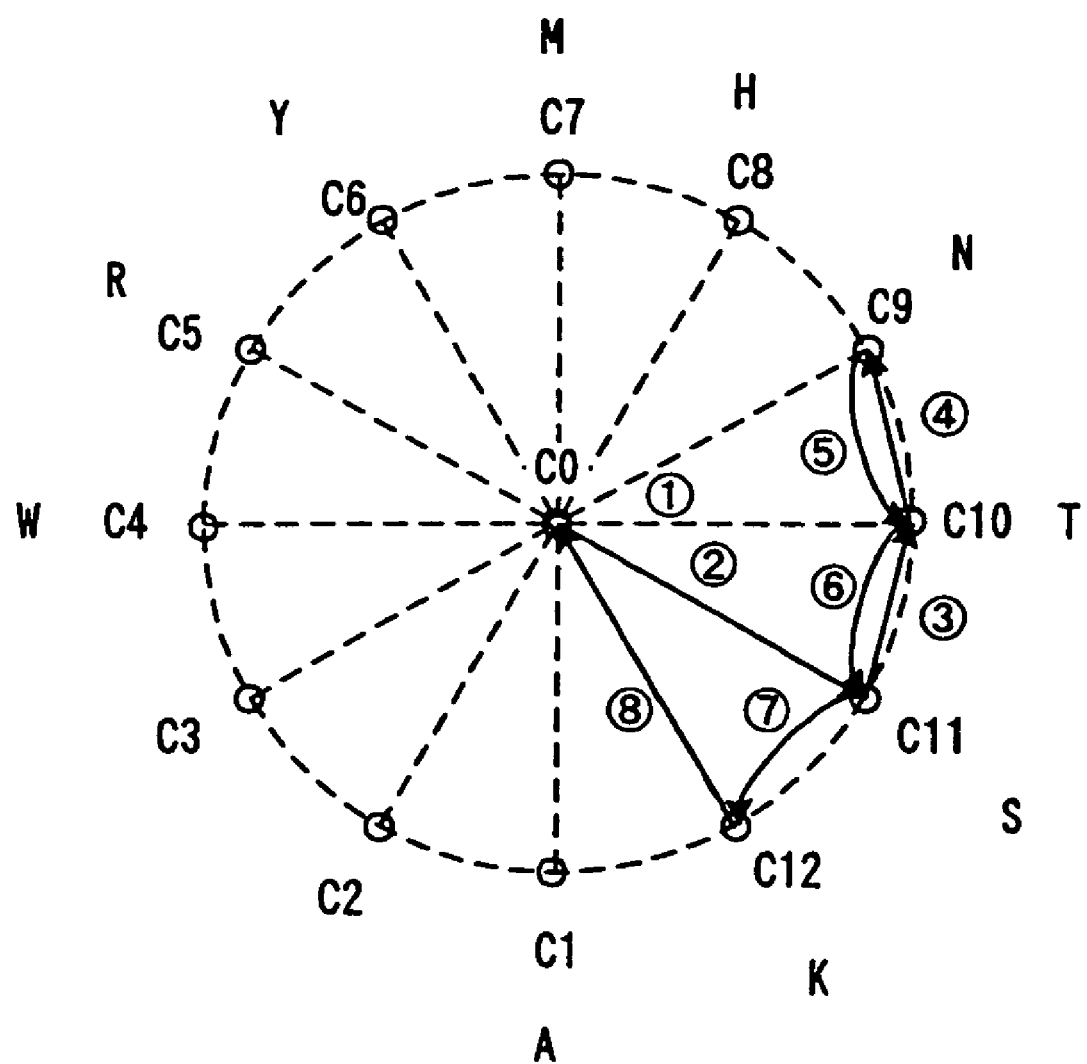
FIG. 7 is a visual representation of operation according to the present invention.
Figure 8:
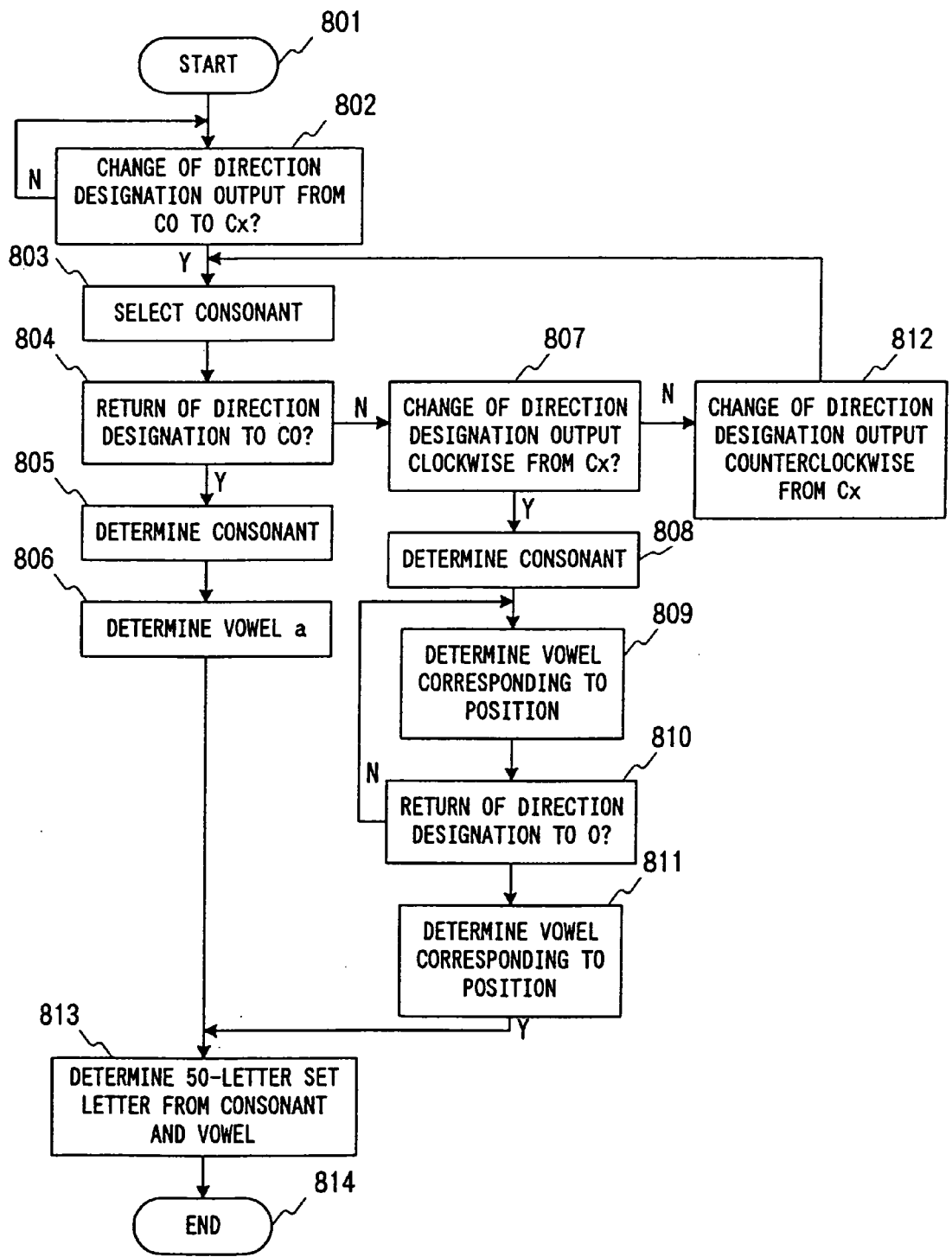
FIGS. 8(a) and 8(b) are flow charts illustrating a main processing and a consonant determining process.
Figure 8:
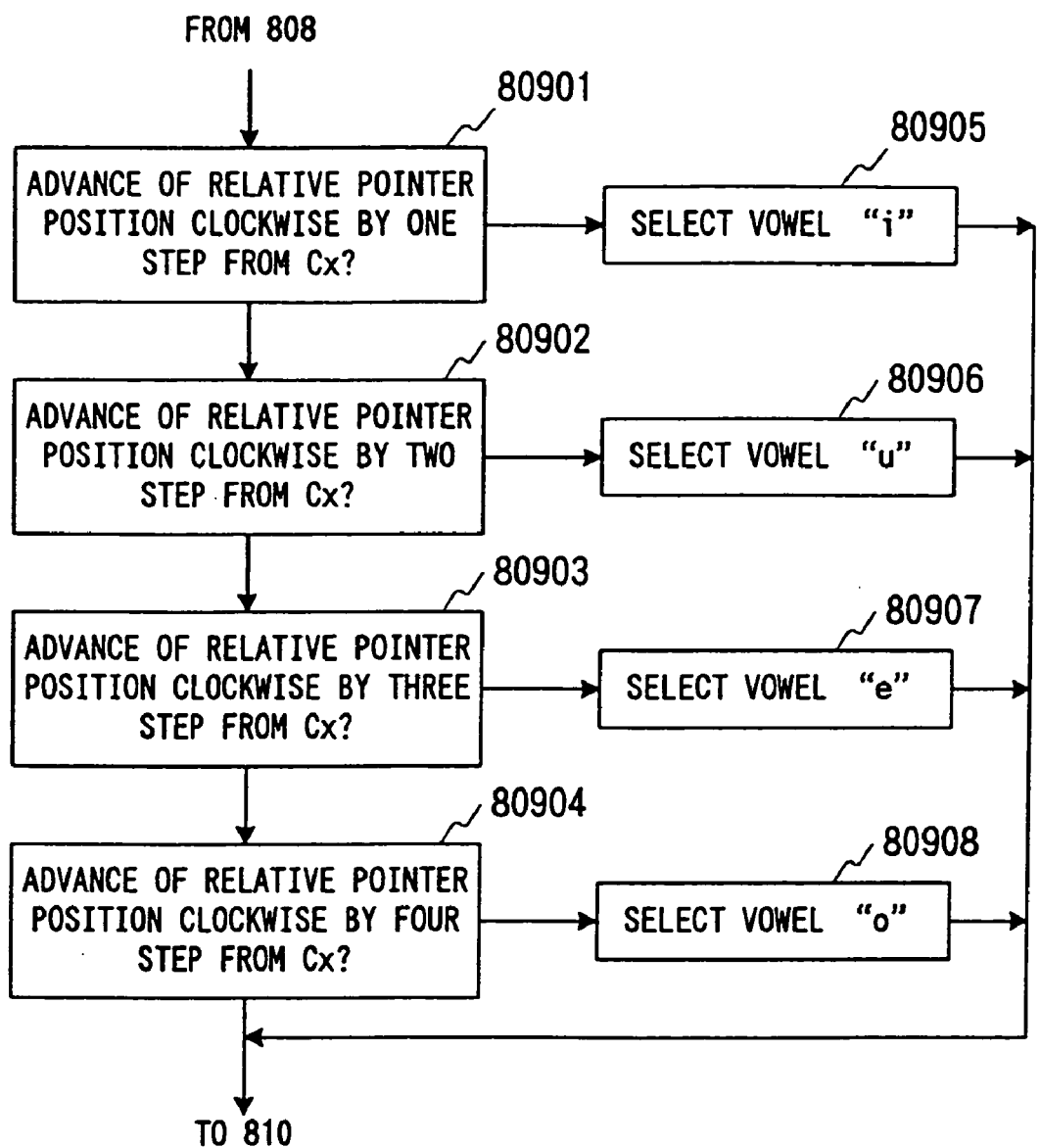

The direction data input part of the direction designation unit is at position C0 in FIG. 7 when it is not touched. In this state, the input part is providing data representing the position C0. This state corresponds to "START" (step 801) in FIG. 8(a).

By moving the input part from this state along radial route ② to position C11, the direction designation unit outputs data representing the position C11 (for instance "Bh").

The CPU is always executing a poring process or an interval timer process to monitor movement of the direction data input part of the direction designation unit from the position C0 to any of the positions C1 to C12 (step 802).

When the CPU detects movement of the input part, it executes consonant selection (step 803). In this consonant selection step, the CPU merely causes display of a consonant prevailing a selected one on the display unit, and does not determine this consonant.

Then, by returning the input part of the direction designation unit to the position C0, the CPU selects vowel "a", and also determines letter "Sa" from the relation between the consonant "S" and the vowel "a". When the katakana input mode is set, katakana letter "Sa" is determined.

In the above routine, the determination of the consonant (step 805) and the determination of vowel "a" (step 806) are executed as a result of detecting the returning of the input part to the position C0 (step 804).

In the case of FIG. 7(a), however, the input part is moved along route ③ to position C10. That is, the input part has been moved circumferentially counterclockwise from direction designation unit output data position Cx (step 802). In this case, the routine goes back to the consonant selection mode (step 803), and then the same check as described above is done. When it is detected that the input part has been moved along route ④ and then route ⑤ to the position C10, the CPU selects vowel "i" (step 809).

By further moving the input part from the position C10 along route ⑥ to position C11, the CPU executes the vowel selection again; this time it selects "u". By still further moving the input part along route ⑦ to position C12, the CPU further executes the vowel selection; this time it selects "e".

Then, by returning the input part along route ⑧ to the position C0 (step 810), the CPU determines the vowel corresponding to the immediately preceding position, i.e., the position C12 (step 811), and determines letter "Ne" by combining the consonant "N" and the vowel "e" (step 813).

FIG. 8(b) illustrates the step 809 of selecting a vowel corresponding to the input part position.

In this step, the CPU selects a vowel corresponding to the direction designation unit output data position, which the input part has been moved to from the consonant determination position.

Specifically, when the direction data input part of the direction designation unit has been moved from the position C0 to position Cx and then returned to the position C0, the CPU selects vowel "a". By moving the input part clockwise from the position Cx by one step (step 80901), the CPU selects "i" (step 80905). Moving the input part by two steps (step 80902) causes selection of "u" (step 80906). Moving the input part by three steps (step 80903) causes selection of "e" (step 80907). Moving he input part by four steps (step 80904) causes selection of "o" (step 80908).

As shown above, the CPU selects a consonant and a vowel and inputs a Japanese letter according to changes in the direction designation unit output data position. A different letter input method again without use of the determining key will now be described with reference to FIG. 9 to 11(a) and 11(B).

Figure 11A:
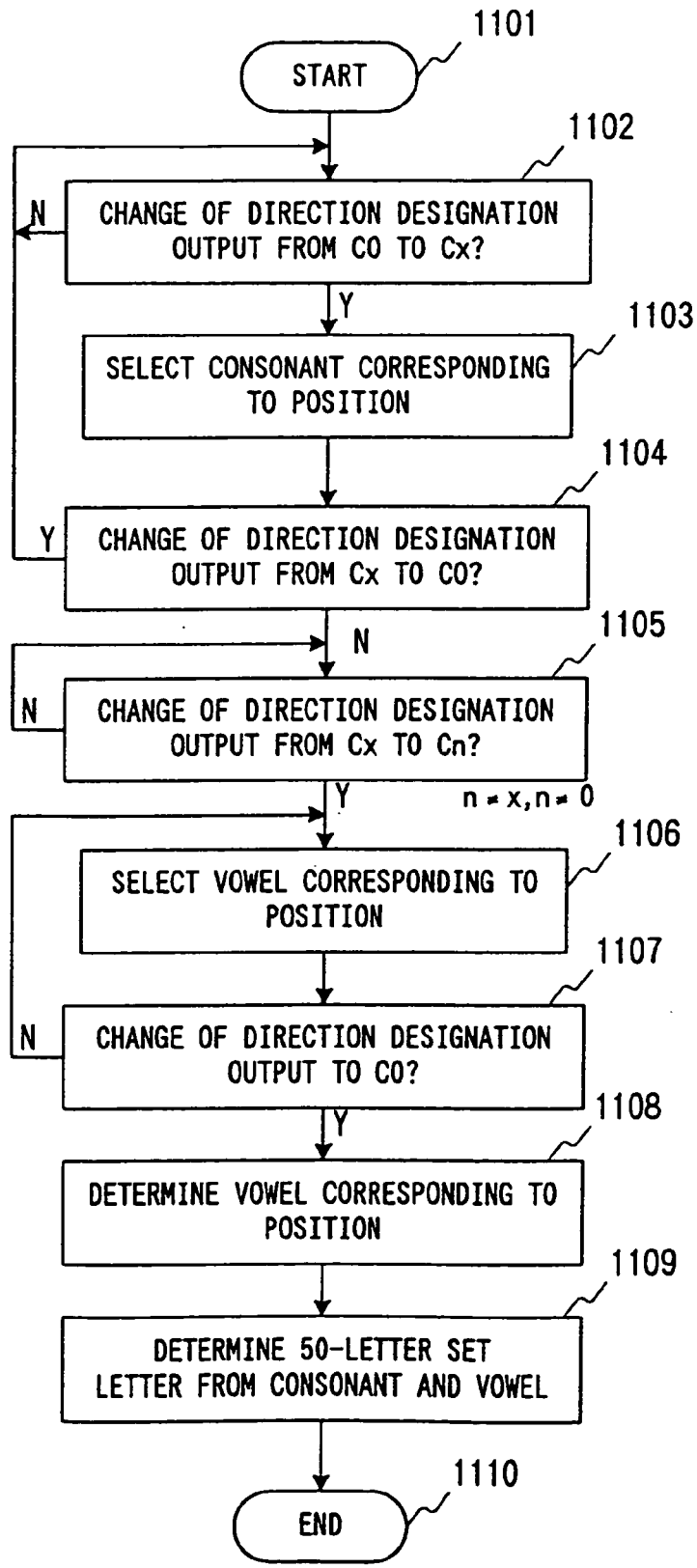
FIGS. 11(a) and 11(b) are flowcharts illustrating operation of the present invention without use of determination key.
Figure 11:
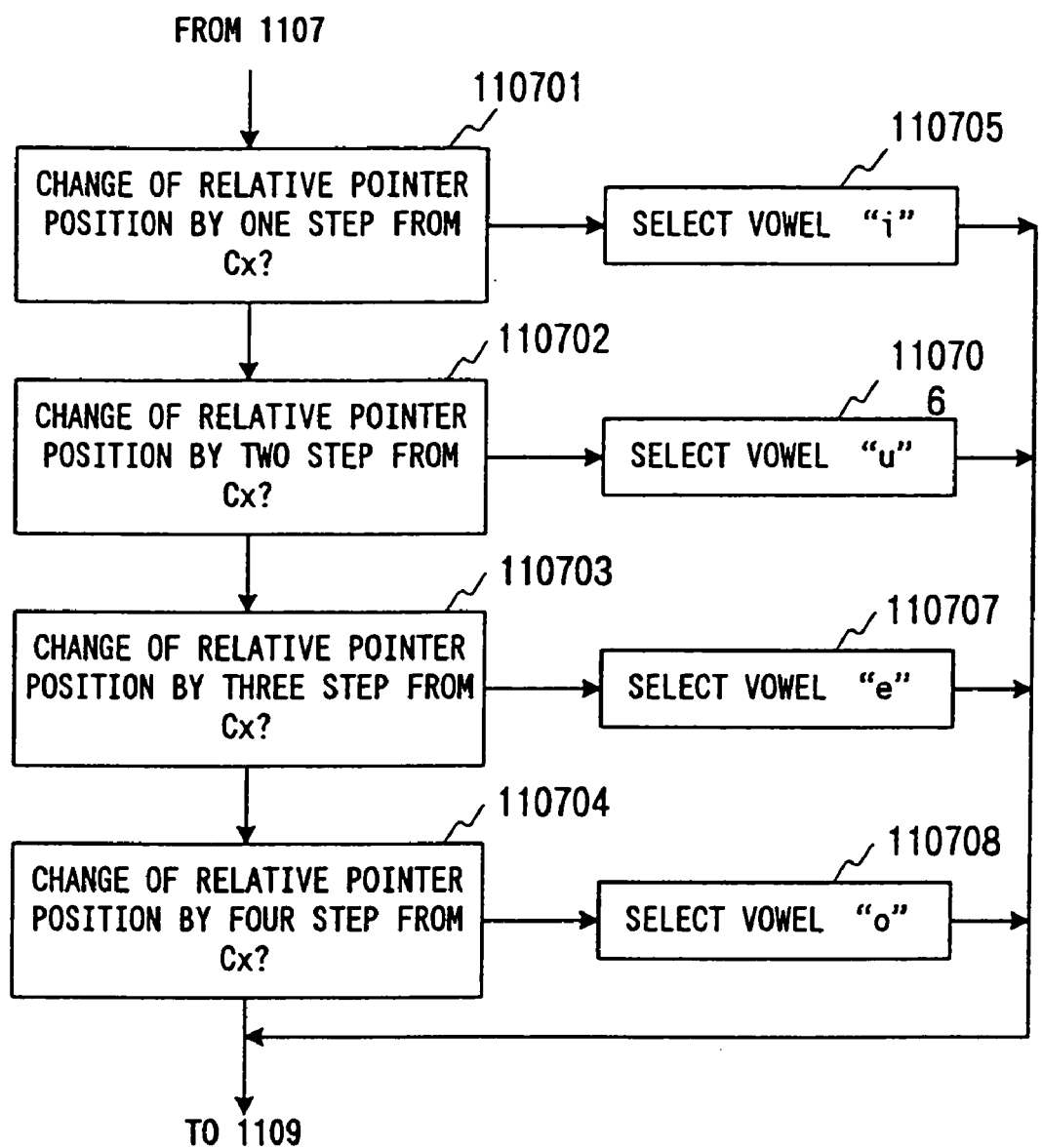

This method permits consonant selection afresh, and FIGS. 11(a) and 11(b) are flow charts illustrating the relevant routine. In this method, the re-selection of a consonant is possible when vowel selection mode has not yet been set up.

The initial state corresponds to "START" (step 1101) in FIG. 11(a). This means that the direction data input part of the direction designation unit is at position C0 in FIG. 9.

By moving the input past from the position C0 to position Cx (1102), the CPU selects a consonant corresponding to that position (step 1103). Assuming x in Cx to be x=10 in FIG. 9, this means that the CPU selects the column of consonant "T" corresponding to the position C10, which the input part is moved to from the position C0 along route ②.

Then, if it is detected that the input device has been returned from the position Cx to the center position C0 directly, i.e., along route ③ and without passing any other position Cn (n≠x, n≠0) other than the center position and its own prevailing position (step 1104), the routine goes back to the step 1102, and consonant selection is executed once again.

However, if it is detected that the input part has been moved from the position Cx to a different circumferential position Cn (n≠x, n≠0) (step 1105), the CPU selects a vowel corresponding to the position Cn (step 1106).

Figure 9:
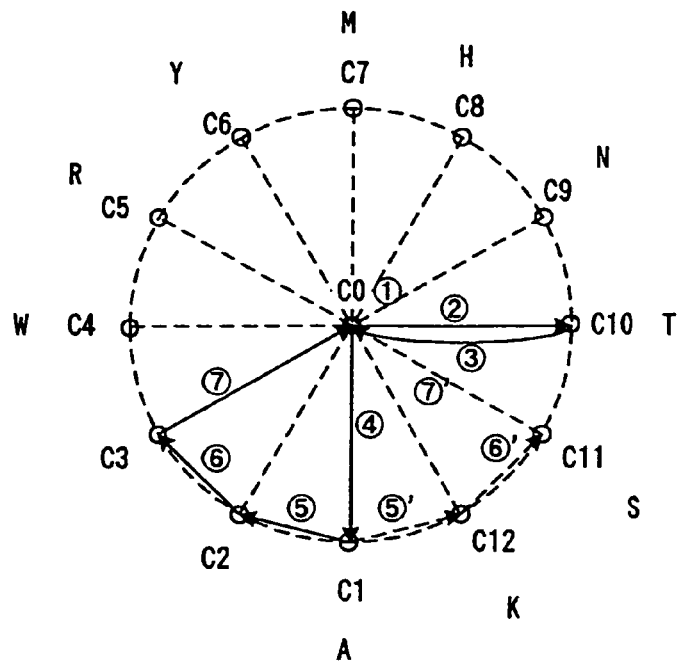
FIG. 9 is a visual representation of operation according to the present invention.

In the example of FIG. 9, the input part of the direction designation unit is moved from the center position C0 along route ④ to position C1, and thence routes ⑤ and ⑥ to position C3. In this case, "A column" of the prevailing consonant is determined to show letter "I" in the display unit, and the "i" vowel row for that column is selected.

By subsequently returning the input part along route ⑦ to the position C0, the direction designation unit outputs data "0h" representing the position C0 (step 1108), and the CPU executes vowel determination, and determines a 50-letter set letter from the determined vowel and consonant (step 1109).

In the routine shown in FIGS. 11(a) and 11(b), the first selected consonant is not replaced in dependence on the direction of movement of the unit part. That is, circumferential movement of the input part after the consonant selection immediately causes vowel selection. As shown in FIG. 11(b), a vowel is selected in correspondence to the number of steps of movement from the consonant determination position. In the example of FIG. 9, it is thus possible, after the selection of the consonant "A" corresponding to the position C1, to input the same letter along routes ⑤ and ⑥ as the letter that is inputted by movement along the routes ⑤ and ⑥.

Figure 10:
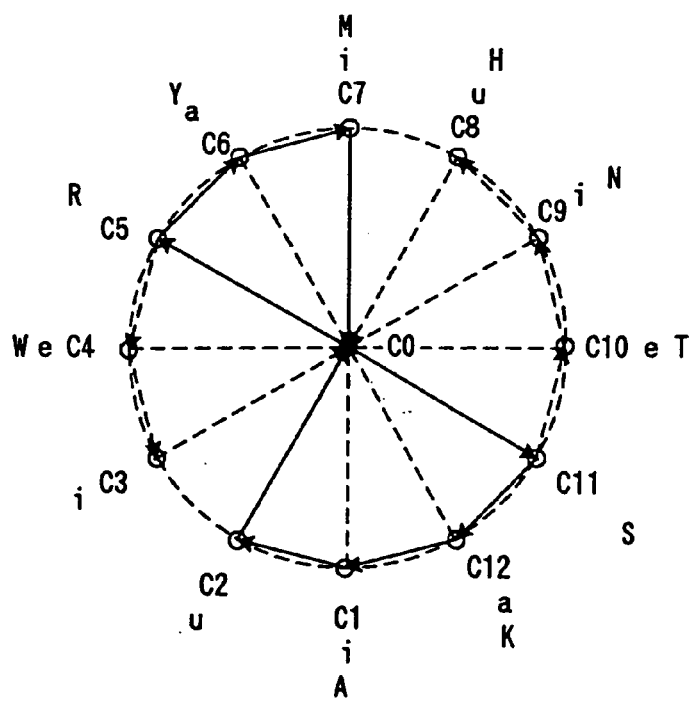
FIG. 10 is a visual representation of operation according to the present invention.

FIG. 10 shows an example of selection of vowels in correspondence to steps of movement.

Referring to the Figure, after selection of consonant "S" by moving the input part from the position C0 to position C11, by moving the input part three steps, i.e., to successive positions C12, C1 and C2 or C10, C9 and C8, and then back to the position C0, the CPU inputs letter "Su". Likewise, after selection of consonant "R" by moving the input part form the position C0 to position C5, by moving the input part two steps, i.e., to successive positions C6 and C7 or C4 and C3, and then back to the position, the CPU inputs letter "Ri".

Figure 12:
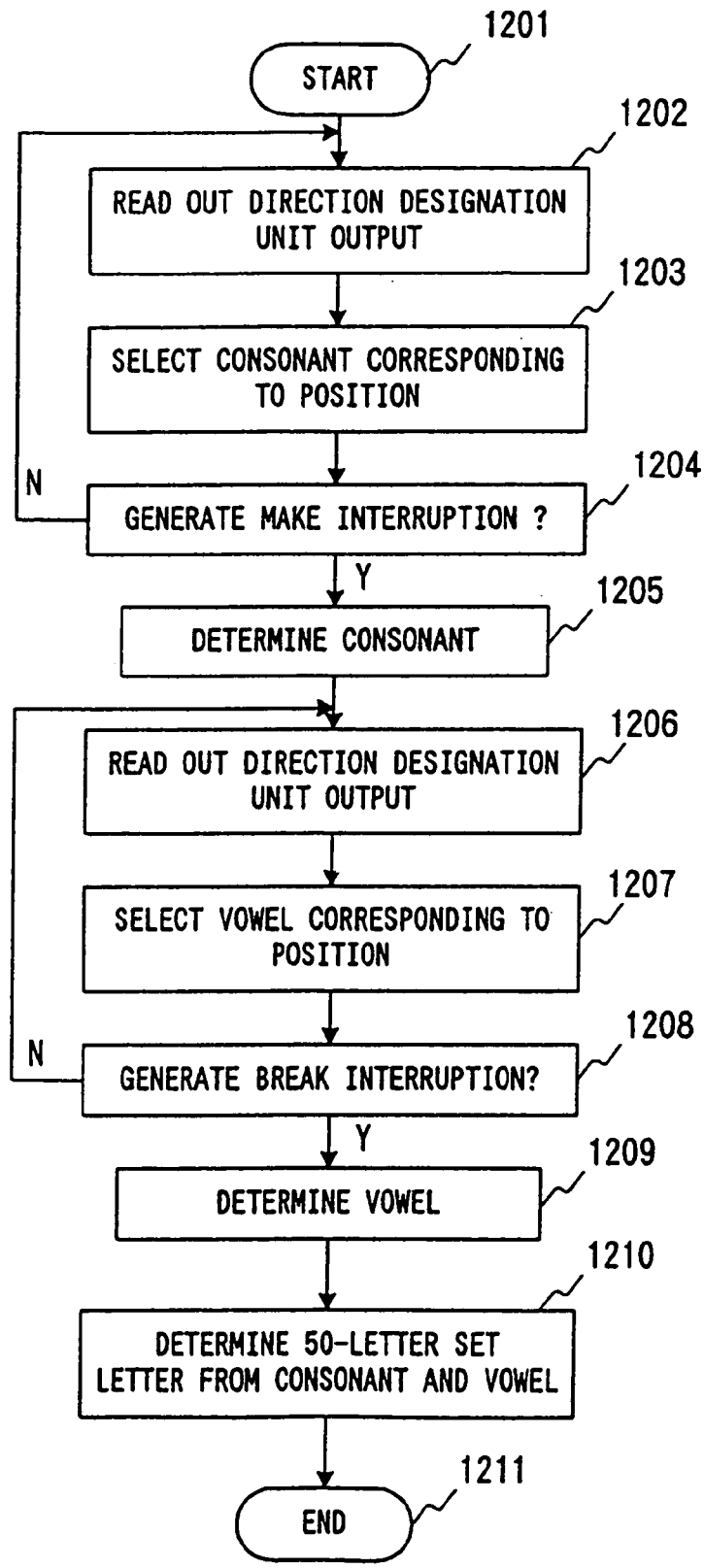
FIG. 12 is a flow chart showing operation of the present invention with use of interruption key.

FIG. 12 illustrates a further routine example, in which the determination of a consonant and a vowel is further simplified by using the determining key.

This routine is effective when it is applied to a single-hand operable device such as shown in FIG. 16, in which direction inputted with the thumb and a letter is determined with the index finger.

Initially, i.e., at "START" (step 1201), the direction data input part 1702 is at the position C0. The CPU is always executing poring process to monitor the output data of the direction designation unit. When the direction designation unit outputs data representing a position other than C0, the CPU shows the selected consonant by showing the same on the display unit (step 1203).

Upon depression of the determining key 1701 the CPU generates a make interruption. Upon releasing of the key 1701, the CPU generates a break interruption.

When the CPU receives the make interruption (step 1204), it determines a consonant (step 1205). Thereafter, the CPU reads out the direction designation unit output data (step 1206), and selects a vowel corresponding to the output data position.

When the break interruption is generated by the releasing of the determining key, the CPU determines a vowel (step 1209), and determines a Japanese letter from the determined consonant and vowel (step 1210).

Further letter input methods using direction designation units like those described above will be described hereinunder.

FIGS. 22(a) and 22(b) are a perspective view and a side view, respectively, illustrating the structure and the operation of an example of the direction designation unit in the embodiment.

As shown in the Figures, the direction designation unit has a stick 2301, which can be depressed in two steps. The device can output two different kinds of signals corresponding to respective tilting angles. The stick may be adapted to be tilted by desired angles in the two successive steps. The difference between the two tilting angles may be clearly known by setting one of the two angles to about one half of the other angle. For example, where the large tilting angle is set to 60 degrees, the small one may be set to about 30 degrees.

FIG. 22(c) shows an alternative to the above example. In this case, a ring-like member 2303 made of rubber or like elastic material is provided such that it surrounds the stick 2301. As shown in FIG. 22(d), by lightly tilting the stick, a resistance is felt when the stick is brought into contact with the ring-like member. As shown in FIG. 22(e), by further tilting the stick with an increased force, the ring-like member is deformed to give a feel of click.

Figure 23:
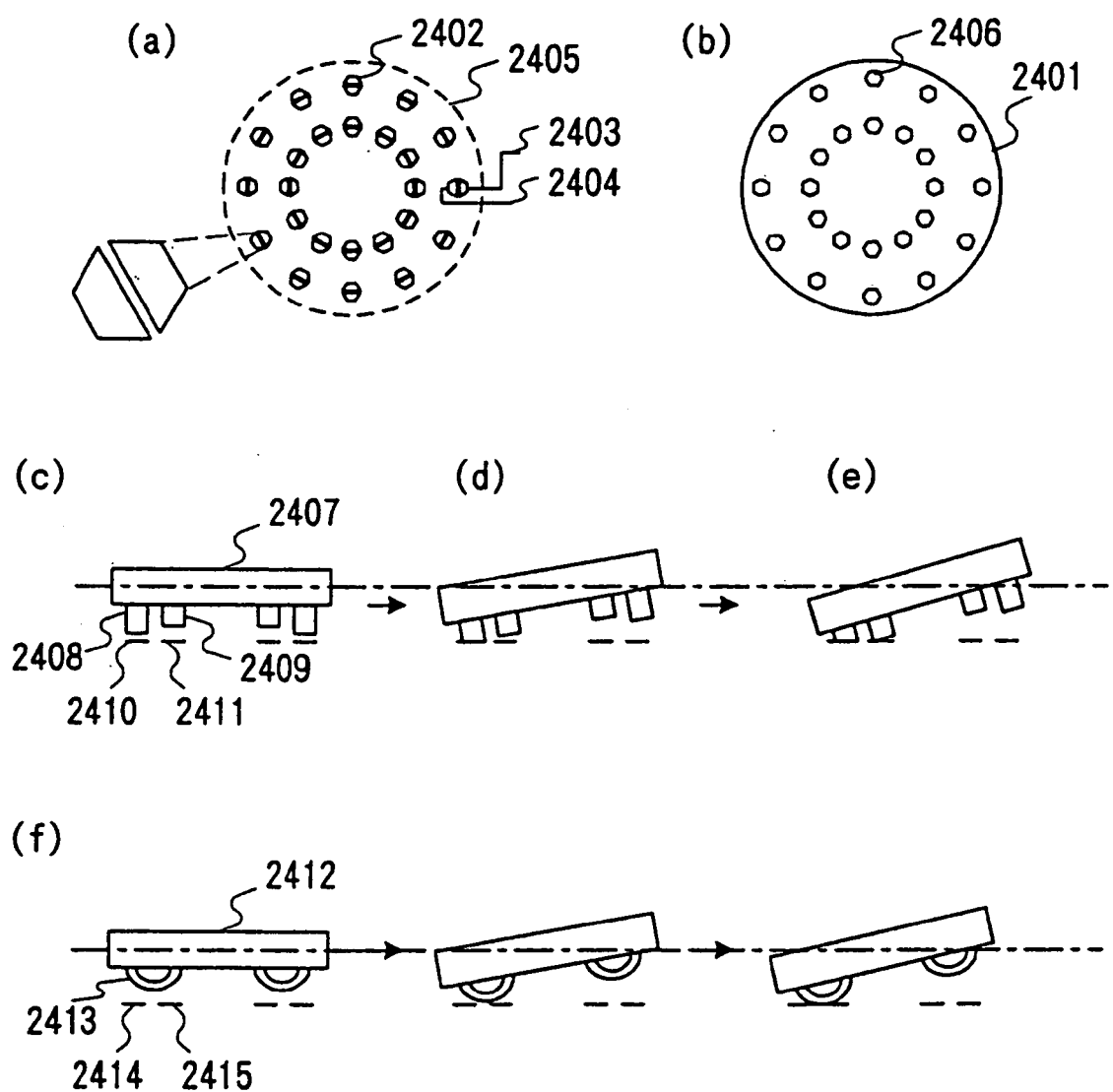
FIGS. 23(a) to 23(e) are perspective views of the pad-like direction designation unit in the embodiment.

FIGS. 23(a) and 23(b) show a further example of the direction designation unit. This unit has a pad-like structure, and designates directions when its peripheral portions are depressed. Specifically, as shown in FIG. 23(a), the device comprises a disc-like base 2405 having a plurality of uniformly circumferentially spaced-apart switches 2402, which are provided on the top surface of the base and each have a pair of wired contacts 2403 and 2404 spaced apart in the radial direction. The switches 2402 are closed by pushing them from above with conductive members 2406. In this unit, a designated direction is detected by confirming electric connection of the corresponding one of the switches.

The conductive members are preferably made of conductive rubber or like material, but they may be made of any other material as well so long as they can be brought into close contact with the switch contacts and turn on the switches when pushed thereagainst.

FIGS. 23(c) to 23(e) show a modification of the example shown in FIGS. 23(a) and 23(b). This unit has conductive pieces in the form of protuberances to be brought into contact with switch contacts. Specifically, as shown in FIG. 23(c), the device comprises a disc-like pad 2407, outer conductive pieces 2408, inner conductive pierces 2409, outer contacts 2410 and inner contacts 2411. The conductive pieces are merely applied by adhesive or the like to the pad, and do not have any contact.

The outer and inner conductive pieces have different lengths or depending dimensions, the outer conductive pieces having slightly greater dimensions. This arrangement is adopted such that, as shown in FIG. 23(d), by slightly tilting the pad in a certain direction the corresponding outer conductive piece is connected to the associated outer contact and, as shown in FIG. 23(e), by further tilting the pad the corresponding inner conductive piece is connected to the associated inner contact.

In the unit shown in FIG. 23(a), the contacts may be formed with central notches extending perpendicular to residual directions. With this arrangement, the switches are electrically connected when the conductive members are sufficiently connected to the corresponding contacts.

FIG. 23(f) shows a different modification of the example shown in FIGS. 23(a) and 23(b). In this unit, elongate sheet-like conductive pieces are applied in a warped fashion to a pad. Specifically, the unit comprises a pad 2412, conductive pieces 2413, outer contacts 2414 and inner pieces 2415.

Each of the conductive pieces may each be applied such that its crown of warp is found right above the associated inner contact. As shown in FIG. 23(f), by so doing, slight tilting of the pad causes connection of the contact piece to the inner contact, and further tilting of the pad causes connection of the conductive piece to the outer contact.

FIGS. 24(a) and 24(b) show examples of the direction designation of the output data of direction designation unit, which can provide two different kinds of output data corresponding to respective tilting angles.

In the example of FIG. 24(a), the unit output data consists of 12 bits allotted to respective directions and each being inverted to "1" when the corresponding direction is designated and a further bit allotted to for the tilting angle discrimination. The most significant bit is "0" when the tilting angle is small, and is "1" when the angle is large.

In the example of FIG. 24(b), in order to reduce the number of hardware lead wires the position number allotment is made by encoding the directions to be designated, and the unit output data consists of 5 bits for both the direction designation and the tilting angle discrimination.

In this example, the most significant bit is allotted to the tilting angle discrimination. Like the example of FIG. 24(b), the most significant bit is "0" when the tilting angle is small, and is "1" when the angle is large.

With the above direction designation units, the letter input may be done in the following way. By first tilting the direction data input part lightly and slightly in a direction to be designated, the consonant selection mode is set up for selecting a consonant to be determined. When a consonant to be determined has been selected, the input part is further tilted with increased force to determine the consonant and also set up the vowel selection mode for selecting a vowel.

The consonant selection mode can be set up again by returning the input part to the center position instead of switching it by further depressing the input part with increased force. The same way of direction allotment to the consonants is preset as in the case described before in connection with FIG. 1.

Specifically, as for the vowel selection the first row vowel "a" is determined by returning the direction data input part to the center position instead of circumferentially moving the input part from the consonant determination position, the second row vowel "i" is determined by circumferential one-step movement of the input part from the consonant determination position in either direction, the vowel "u" is determined by further one-step movement, the vowel "e" is determined by still further one-step movement, and the vowel "o" is determined by yet further one-step movement. It is adapted that the same results can be obtained by circumferential movement in either direction, i.e., either clockwise or counterclockwise.

When a consonant to be determined is selected, it can be determined by releasing the direction data input part, i.e., returning the input part to the center position, with subsequent need of doing nothing. In the event when the direction designation unit is erroneously brought to the small angle tilted state during the vowel election mode with the unit in the large angle tilted state, continual vowel selection may be made by bringing about the large angle tilted state again. When a consonant and a vowel are determined, a Japanese letter is determined from these data.

It is thus possible to replace the determining key with the two-step tilting of the direction data input part for independently inputting a consonant and a vowel.

It is further possible to provide the role of a row renewal key, which is frequently operated in sentence input, by providing such a direction designation unit structure as to permit a depression output to be obtained by depression with such a feel as to depress a button while the unit is at the center position. Such a structure easily permits inputting Japanese letters and making row renewal at the end of a paragraph.

Furthermore, with a direction designation unit which can detect tilting angle in two steps, it is readily possible to switch the cursor movement, which is thought to be a function frequently used in this type of portable terminal, and the scrolling of the display.

For example, it is possible to permit the cursor movement to be obtained by small angle tilting of the direction data input part and the switching of the mode over to a high speed display scrolling mode by large angle tilting of the input part.

FIG. 25(a) illustrates the manner of the cursor movement obtained by the small angle tilting of the input part, and FIG. 25(b) illustrates the display scrolling mode set up by the large angle tilting of the input part.

As has been described in the foregoing, according to the present invention a letter set is formed by arranging desired letters and symbols in a matrix array of M columns and N rows, and it is made possible to designate coordinates of the columns and rows of letters with a stick or like coordinate data input means. Thus, when the present invention is applied to a Japanese letter input device for a portable terminal, it is possible to obtain an effect of permitting letters, particularly Japanese kana letters, to be easily inputted with less necessary space.

In addition, Japanese kana letters are inputted by disassembling them into consonants and vowels. Thus, the user need only preliminarily memorize 10 different direction positions allotted to the consonants and five different intervals covered by movement from a consonant determination position for the selection of the vowels. The user becoming familiar with the device thus input letters intuitively, that is, it is possible to input letters intuitively without particular reference to the display.

Furthermore, where a direction designation unit capable of detecting directions is used for the letter selection, neither a letter writing pen as in the touch panel system nor reference to a ten key set in the letter selection as in the ten key system is necessary.

Still further, where a button switch is used for determining a letter by depressing it, the selection and determination of a letter can be easily done with a single hand.

Where no such button switch is used, it is possible to further reduce the necessary space of the letter input device.

Moreover, where directions of tilting of a direction designation unit are allotted to consonants in a letter set, it is possible to permit selection of a consonant by moving the unit. Also, where intervals of movement are allotted to vowels, it is possible to permit input of a Japanese letter as a combination of a consonant and a vowel by merely changing the direction designation position of the direction designation unit. With these arrangements, it is thus possible to realize the letter input with a single hand or a single finger.

Changes in construction will occur to those skilled in the art and various apparently different modifications and embodiments may be made without departing from the scope of the present invention. The matter set forth in the foregoing description and accompanying drawings is offered by way of illustration only. It is therefore intended that the foregoing description be regarded as illustrative rather than limiting.

What is claimed is:

1. A Japanese letter input method for inputting letters and symbols in a letter set for use in a Japanese letter input device, comprising the steps of
    disposing predetermined letters and symbols in a concentric circle form; and
    inputting letters or symbols by designating, in a predetermined sequence, coordinates on the concentric circle form corresponding to the letters and symbols by using a position input device, wherein said position input device is capable of moving from a center of said concentric circle form outward along one of several directions to a point on the circumference of said concentric circle form, and wherein selection of letters or symbols is made using a memory unit.

2. The Japanese letter input method of claim 1, wherein the letter set includes romanji alphabet letters, numerals and symbols.

3. A Japanese letter input method for inputting letters and symbols in a letter set for use in a Japanese letter input device, comprising the steps of
    disposing predetermined letters and symbols in a concentric circle form; and
    inputting letters or symbols by designating, in a predetermined sequence, coordinates on the concentric circle form corresponding to the letters and symbols by using a position input device, wherein selection of letters or symbols is made using a memory unit, and wherein the letter set is a 50-letter set in which kana letters of the same consonant are arranged in a same direction, kana letters of the same vowel are arranged on a same circumference, and symbols are disposed in a directional concentric form.

4. The Japanese letter input method of claim 3 wherein the symbols include the p-sound symbol.

5. A Japanese letter input device for a portable terminal comprising:
    a direction designation unit having a plurality of direction designation positions uniformly spaced apart in a circle with a center position and a predetermined radius, the direction designation unit including a pointer capable of being moved radially in a two dimensional plane from a reference position located at the center position of the circle to a first direction designation position and then circumferentially to a second direction designation position, and then returned to the reference position, the direction designation unit detecting the first direction designation position, which the pointer is first radially moved to, and the second direction designation position, which the pointer is located at after being moved circumferentially and before being returned to the reference position, and outputting position data of the detected direction designation positions;
    a data processing unit for generating letter codes from the position data outputted from the direction designation unit by using a memory means with a letter set stored therein; and
    a display unit displaying the letter codes generated at the data processing unit.

6. The Japanese letter input device for a portable terminal according to claim 5, which further comprises a buffer for temporarily storing input data of the direction designation unit.

7. The Japanese letter input device for a portable terminal according to claim 5, in which a plurality of letter sets are stored, and which further comprises a means for selecting each of the letter sets.

8. The Japanese letter input device for a portable terminal according to claim 7, wherein one of the letter sets is in the form of an M-column N-row matrix array obtained by arranging kana letters in the 50-letter set in a matrix array of columns and rows, the columns each consisting of letters assigned by the same consonant, the rows consisting of letters of the same level, and symbols including the consonant mark and the p-sound mark, direction designation positions being each allotted to each row of the letter set.

9. The Japanese letter input device for a portable terminal according to claim 7, wherein one of the letter sets is obtained by arranging romaji alphabet letters, numerals and symbols in M columns and N rows.

10. The Japanese letter input device for a portable terminal according to claim 5, wherein the data processing unit selects a row of the letter set corresponding to the first direction designation position represented by the position data outputted from the direction designation unit.

11. The Japanese letter input device for a portable terminal according to claim 10, wherein the data processing unit detects, upon reception of the position data representing the second direction designation position from the direction designation unit, an interval of circumferential movement of the pointer from the difference between this position data and the previously received position-data representing the first direction designation position, selects a row of the letter set, and outputs, upon reception of a determination signal, a code of a particular letter or symbol in the letter set by combining the selected column and row of the letter set.

12. The Japanese letter input device for a portable terminal according to claim 11, wherein the direction designation unit continuously outputs position data during movement of the pointer, and the data processing unit causes, upon reception of the position data of the first direction designation position, a code representing a row of the letter set corresponding to the first direction designation position, for instance the first column letter in the same row, to be displayed on the display unit, causes, after determination of the displayed row of the letter set, letters representing columns determined by intervals of movement of the pointer to be successively displayed on the display unit, and outputs, upon determination of a displayed letter, a signal representing the same displayed letter.

13. The Japanese letter input device according to claim 5, wherein the data processing unit causes, while the pointer is circumferentially moved in a predetermined direction after starting movement from the reference position and reaching the first direction designation position, causes such row selection mode indication as to cause letters representing rows of the letter set corresponding to relayed direction designating positions to be successively displayed on the display unit, determines, when the pointer is once stopped and then turns to be moved in the reverse direction, a row of the letter set corresponding to the direction designation position, which the pointer is once stopped at, while also deciding that a row selection mode has been set up and causing successive display of letters representing rows corresponding to intervals of movement of the pointer, decides, when the pointer is returned to the reference position, that the prevailing displayed row has been determined, thus outputting a signal of a letter corresponding to the determined column and row.

14. The Japanese letter input device for a portable terminal according to claim 5, wherein the direction designation unit includes a determining switch for informing, when the first and second direction designation positions and the combination thereof are determined while the pointer is moved, the determination to the data processing unit.

15. The Japanese letter input device for a portable terminal according to claim 5, wherein the direction designation unit includes a pointer mechanism having a plurality of direction designation positions uniformly spaced apart on two concentric circles, the pointer mechanism detecting each of the direction designation positions stepwise when tilted from a center position in radial direction.

16. The Japanese letter input unit for a portable terminal according to claim 15, wherein the direction designation unit is switchable between a column input mode and a row input mode in dependence on two different tilting angles, effect column input when tilted by small angle, effects row input when tilted by large angle, effects column determination when tilted to the large angle during the column selection in the small angle tilted state, effects row selection when tilted to the large angle once again, effects row determination when subsequently returned to the center position, and effects input of a Japanese kana letter by combining the determined column and row.

17. The Japanese letter input device according to claim 16, wherein the direction designation unit inputs a consonant of the Japanese kana letter set at the time of the column input, and inputs a vowel of the Japanese kana letter set at the time of the row input.

18. The Japanese letter input device according to claim 16, wherein the direction designation unit inputs letters in a romaji alphabet letter set at the time of the column input, and inputs the orders of the inputted letters at the time of the row input.

19. The Japanese letter input device for a portable terminal according to claim 16, wherein the direction designation unit includes an elastic member to let a tilting angle of the pointer be known with a feel of click.

20. The Japanese letter input device according to claim 19, wherein the direction designation unit has a structure that the user is given a feel of click whenever the pointer being circumferentially moved reaches a direction designation position.

21. The Japanese letter input device for a portable terminal according to claim 5, which further comprises a button or like switch for switching a letter input operation and a cursor operation of the direction designation unit over to each other.

22. The Japanese letter input device for a portable operation according to claim 21, wherein the direction designation can be switched to set up a cursor movement mode and a display scroll mode in dependence on angles of tilting it when used for the cursor operation, the cursor movement mode being set up by tilting the unit by small angle, the display scroll mode being set up by tilting the unit by a large angle.

23. The Japanese letter input device for a portable terminal according to claim 22, wherein when the direction designation unit is used for the cursor operation, the extent of movement of cursor is changed according to the tilting angle of the pointer for inputting commands concerning the display operation.

24. A Japanese letter input method for inputting letters in a letter set used in a Japanese letter input device, comprising the steps of i) providing a Japanese letter input device for a portable terminal, wherein said input device comprises
a direction designation unit having a plurality of direction designation positions uniformly spaced apart in a circle with a center position and a predetermined radius, the direction designation unit including a pointer;

ii) moving said pointer radially in a two-dimensional plane from a reference position located at the center position of the circle to a first direction designation position;

iii) moving said pointer circumferentially to a second direction designation position;

iv) returning said pointer to the reference position;

v) detecting said first and second direction designation positions;

vi) outputting first and second direction designation position data to a data processing unit by means of a memory means with a letter set stored therein; and vii) displaying letter codes generated at the data processing unit.

25. The method of claim 24 further comprising temporarily storing input data of the direction unit in a buffer.

26. The method of claim 24 wherein a plurality of letter sets are stored in said memory means, and a means for selecting each of the letter sets is provided.

27. The method of claim 26, wherein one of the letter sets is in the form of an M-column N-row matrix array obtained by arranging kana letters in the 50-letter set in a matrix array of columns and rows, the columns each consisting of letters assigned by the same consonant, the rows consisting of letters of the same level, and symbols including the consonant mark and the p-sound mark, direction designation positions being each allotted to each row of the letter set.

28. The method of claim 26, wherein one of the letter sets is obtained by arranging romaji alphabet letters, numerals and symbols in M columns and N rows.

29. The method of claim 24, wherein the data processing unit selects a row of the letter set corresponding to the first direction designation position represented by the position data outputted from the direction designation unit.

30. The method of claim 29, wherein the data processing unit detects, upon reception of the position data representing the second direction designation position from the direction designation unit, an interval of circumferential movement of the pointer from the difference between this position data and the previously received position-data representing the first direction designation position, selects a row of the letter set, and outputs, upon reception of a determination signal, a code of a particular letter or symbol in the letter set by combining the selected column and row of the letter set.

31. The method of claim 30, wherein the direction designation unit continuously outputs position data during movement of the pointer, and the data processing unit causes, upon reception of the position data of the first direction designation position, a code representing a row of the letter set corresponding to the first direction designation position, for instance the first column letter in the same row, to be displayed on the display unit, causes, after determination of the displayed row of the letter set, letters representing columns determined by intervals of movement of the pointer to be successively displayed on the display unit, and outputs, upon determination of a displayed letter, a signal representing the same displayed letter.

32. The method of claim 24, wherein the data processing unit causes, while the pointer is circumferentially moved in a predetermined direction after starting movement from the reference position and reaching the first direction designation position, causes such row selection mode indication as to cause letters representing rows of the letter set corresponding to relayed direction designating positions to be successively displayed on the display unit, determines, when the pointer is once stopped and then turns to be moved in the reverse direction, a row of the letter set corresponding to the direction designation position, which the pointer is once stopped at, while also deciding that a row selection mode has been set up and causing successive display of letters representing rows corresponding to intervals of movement of the pointer, decides, when the pointer is returned to the reference position, that the prevailing displayed row has been determined, thus outputting a signal of a letter corresponding to the determined column and row.

33. The method of claim 24, wherein the direction designation unit includes a determining switch for informing, when the first and second direction designation positions and the combination thereof are determined while the pointer is moved, the determination to the data processing unit.

34. The method of claim 24, wherein the direction designation unit includes a pointer mechanism having a plurality of direction designation positions uniformly spaced apart on two concentric circles, the pointer mechanism detecting each of the direction designation positions stepwise when tilted from a center position in radial direction.

35. The method of claim 34, wherein the direction designation unit is switchable between a column input mode and a row input mode in dependence on two different tilting angles, effect column input when tilted by small angle, effects row input when tilted by large angle, effects column determination when tilted to the large angle during the column selection in the small angle tilted state, effects row selection when tilted to the large angle once again, effects row determination when subsequently returned to the center position, and effects input of a Japanese kana letter by combining the determined column and row.

36. The method of claim 35, wherein the direction designation unit inputs a consonant of the Japanese kana letter set at the time of the column input, and inputs a vowel of the Japanese kana letter set at the time of the row input.

37. The method of claim 35, wherein the direction designation unit inputs letters in a romaji alphabet letter set at the time of the column input, and inputs the orders of the inputted letters at the time of the row input.

38. The method of claim 35 wherein the direction designation unit includes an elastic member to let a tilting angle of the pointer be known with a feel of click.

39. The method of claim 38, wherein the direction designation unit has a structure that the user is given a feel of click whenever the pointer being circumferentially moved reaches a direction designation position.

40. The method of claim 24, which further comprises a button or like switch for switching a letter input operation and a cursor operation of the direction designation unit over to each other.

41. The method of claim 40, wherein the direction designation can be switched to set up a cursor movement mode and a display scroll mode in dependence on angles of tilting it when used for the cursor operation, the cursor movement mode being set up by tilting the unit by small angle, the display scroll mode being set up by tilting the unit by a large angle.

42. The method of claim 41, wherein when the direction designation unit is used for the cursor operation, the extent of movement of cursor is changed according to the tilting angle of the pointer for inputting commands concerning the display operation.

* * * * *